United States Patent [19]
Coden

[11] Patent Number: 6,154,462
[45] Date of Patent: Nov. 28, 2000

[54] CIRCUITS AND METHODS FOR A RING NETWORK

[75] Inventor: Michael H. Coden, Riverdale, N.Y.

[73] Assignee: ADC Telecommunications, Inc., Minnetonka, Minn.

[21] Appl. No.: 08/915,919

[22] Filed: Aug. 21, 1997

[51] Int. Cl.[7] .................................................. H04L 12/56
[52] U.S. Cl. ............................................ 370/403; 370/258
[58] Field of Search .................................... 370/400, 401, 370/402, 403, 404, 405, 406, 350, 351, 352, 356, 379, 382, 389, 395, 396, 397, 398, 399, 250, 252, 254, 253, 257, 258

[56] References Cited

U.S. PATENT DOCUMENTS

| | | | |
|---|---|---|---|
| 4,293,948 | 10/1981 | Soderblom | 370/90 |
| 4,553,234 | 11/1985 | Brandsma et al. | 370/403 |
| 4,750,171 | 6/1988 | Kedar et al. | 370/85 |
| 4,752,924 | 6/1988 | Darnell et al. | 370/86 |
| 4,757,497 | 7/1988 | Beierle et al. | 370/89 |
| 4,836,317 | 6/1989 | Straussmann et al. | 178/2 R |
| 4,908,824 | 3/1990 | Leibe et al. | 370/403 |
| 4,933,937 | 6/1990 | Konishi | 370/94.1 |
| 4,947,390 | 8/1990 | Sheehy | 370/403 |
| 5,003,531 | 3/1991 | Farinholt et al. | 370/16.1 |
| 5,101,405 | 3/1992 | Bekki et al. | 370/85.15 |
| 5,105,188 | 4/1992 | Jung et al. | 340/825.05 |
| 5,179,548 | 1/1993 | Sandesara | 370/16.1 |
| 5,218,603 | 6/1993 | Watanabe | 370/403 |
| 5,220,562 | 6/1993 | Takada et al. | 370/94.1 |
| 5,301,185 | 4/1994 | Cherry | 370/16.1 |
| 5,337,309 | 8/1994 | Faulk | 370/60 |
| 5,444,692 | 8/1995 | Basso et al. | 370/403 |
| 5,477,540 | 12/1995 | Yang et al. | 370/403 |
| 5,483,536 | 1/1996 | Gunji et al. | 370/85.14 |
| 5,490,252 | 2/1996 | Macera et al. | 370/94.1 |
| 5,495,232 | 2/1996 | Kochem et al. | 340/825.05 |
| 5,581,710 | 12/1996 | Noel et al. | 395/200.21 |
| 5,600,366 | 2/1997 | Schulman | 348/9 |
| 5,610,905 | 3/1997 | Murthy et al. | 370/401 |
| 5,617,412 | 4/1997 | Chin et al. | 370/402 |
| 5,651,000 | 7/1997 | Lee et al. | 370/258 |
| 5,651,003 | 7/1997 | Pearce | 370/395 |
| 5,652,615 | 7/1997 | Bryant et al. | 348/9 |
| 5,657,327 | 8/1997 | Hamada et al. | 370/389 |
| 5,659,543 | 8/1997 | Ater et al. | 370/258 |
| 5,684,800 | 11/1997 | Dobbins | 370/401 |
| 5,822,018 | 10/1998 | Farmer | 348/705 |
| 5,872,783 | 2/1999 | Chin | 370/401 |
| 5,892,922 | 4/1999 | Lorenz | 395/200.68 |
| 5,909,686 | 6/1999 | Muller et al. | 370/401 |
| 5,920,566 | 7/1999 | Hendel et al. | 370/401 |

OTHER PUBLICATIONS

Bucci, G., et al., "Design and performance evaluation of a high throughput Ethernet/FDDI Interconnect", Proceedings Advanced computer Technology, Reliable Systems and Applications; 5th Annual European Computer Conference, Bologna, pp. 89–93, (May 13–16, 1991).

Bucci, G., et al., "Performance Analysis of Two Different Algorithms for Ethernet–FDDI Interconnection", *IEEE Transactions on Parallel and Disbributed Systems,* vol. 5, No. 6, pp. 614–629, (Jun. 1994).

Ohteru, Y., "Interconnecting IEEE 802 LANS by a wideband backbone network", *IEEE,* pp. 130–135, (1987).

*Primary Examiner*—Ricky Ngo
*Assistant Examiner*—Steven Nguyen
*Attorney, Agent, or Firm*—Fogg, Slifer & Polglaze, P. A.; David N. Fogg

[57] ABSTRACT

A ring switch for a ring network is provided. The ring switch includes at least one ring port that is coupleable to transport data packets in a ring network. Further, the ring switch includes at least one local port that is coupleable to at least one local area network. The ring switch also includes at least one address table that tracks the addresses of network devices associated with each port of the ring switch based on source addresses of data packets received at the ports of the ring switch. Data packets received at the at least one ring port that are not destined for a network device associated with any of the at least one local ports of the ring switch are switched to another ring switch coupled to the at least one ring port based on the at least one address table without the use of a token or encapsulating the packet.

48 Claims, 12 Drawing Sheets

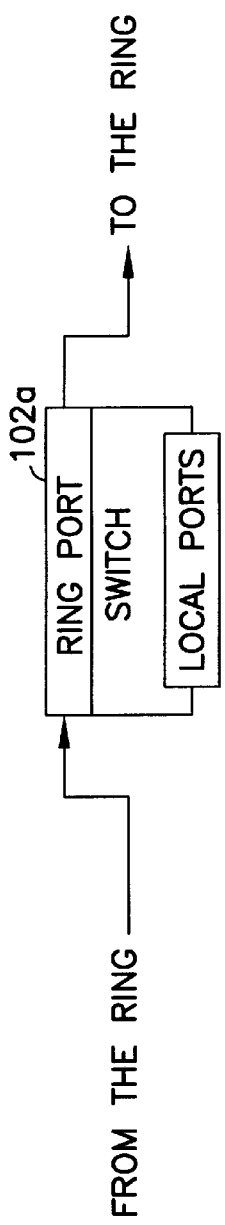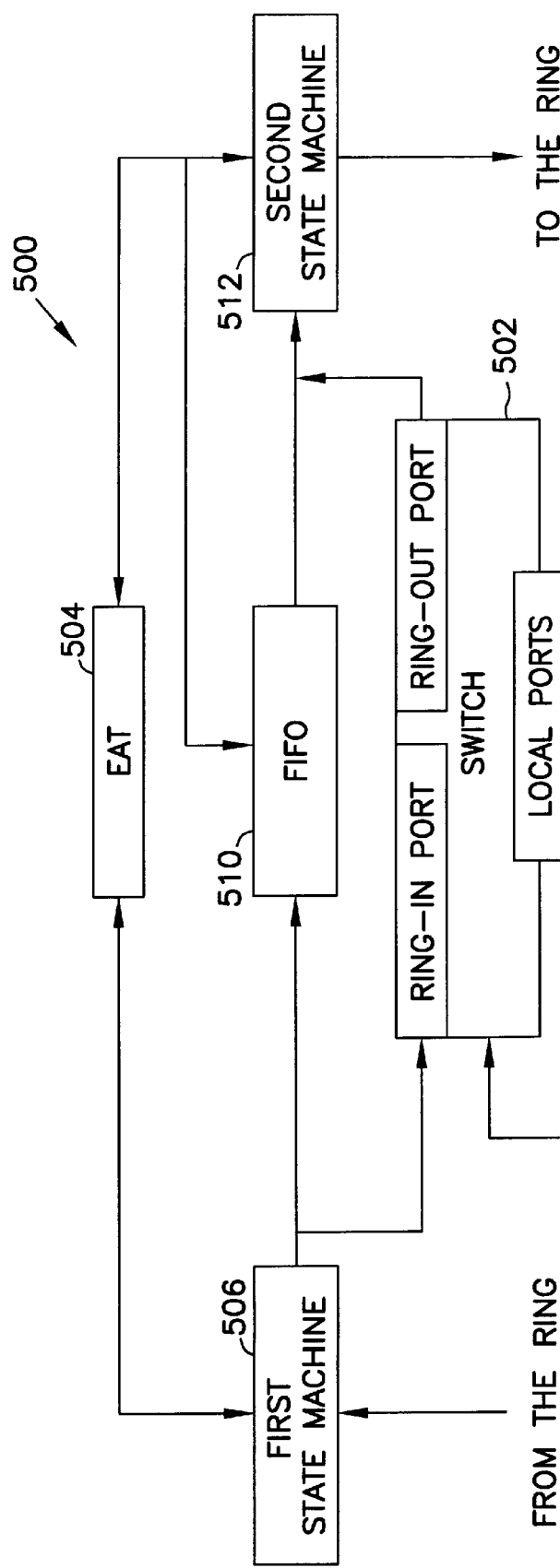

CIRCUITS AND METHODS FOR A RING NETWORK

TECHNICAL FIELD OF THE INVENTION

The present invention relates generally to the field of communications and, in particular, to circuits and methods for a ring network.

BACKGROUND OF THE INVENTION

Computer networks have become commonplace in large and small businesses, universities, and other organizations. Such networks allow a number of users to share data and resources, such as data storage systems, file servers, switches, routers, printers, modems, and other peripherals. There are three basic types of protocols for transmitting data in these networks exemplified by: Ethernet, Token Ring or Fiber Distributed Data Interface (FDDI) and encapsulation. Each of these network protocols have advantages and disadvantages which are presented briefly here in Section I of the Background of the Invention in order to better understand the teachings of the present invention. Further, conventional Ethernet protocols are described in Section II. Finally, aspects of conventional Ethernet switches that limit the ability of such switches to be configured in a ring network are described in part III.

I. Network Protocols

Ethernet, described more fully below, is basically a broadcast protocol. Its main advantage is its simplicity. This allows Ethernet to be implemented with less costly hardware and software. The main drawback with conventional Ethernet is that there are significant limitations on the physical distance that the network can cover. Further, conventionally, the bandwidth of an Ethernet network is greater closer to the center of the network.

Token Ring and FDDI, as described in computer industry standards IEEE-802.5 and ANSI XT3.9, respectively, provide the distinct advantage that data can be transmitted over much greater distances when compared to conventional Ethernet. Further, Token Ring and FDDI provide virtually equal bandwidth throughout the network. The main disadvantage of Token Ring and FDDI is their complex protocols which make the equipment significantly more costly than Ethernet equipment. These complex protocols are necessitated by the manner in which packets are transmitted in Token Ring and FDDI networks. The protocols are dependent on the use of a "token." This token is passed around the network such that only the network entity, or entities, in possession of a token can transmit data on the network. When a token is corrupted, the network elements are unable to transmit packets on the network. In some instances, this can last for several seconds. To compensate for this problem, complex protocols have been developed that allow the network elements to determine when a token has been lost and to create a new token. The enormous amount of logic circuitry required to implement these protocols makes Token Ring and FDDI networks expensive to implement and maintain when compared to Ethernet networks.

Finally, encapsulation protocols have been developed to allow Ethernet packets to be transmitted over longer distances. In such protocols, the entire Ethernet packet is placed within another type of packet with its own header including additional addressing information, protocol information, etc. These protocols typically also suffer from the problem that they may require special higher level protocol information to be included in the data field of the Ethernet packets for purposes of directing routers in the network, thereby limiting the types of data packets that can be handled and putting significant processing burden on both the network devices generating the packets and the routers used to transmit and receive the packets between the various Ethernet networks. These additional protocol elements and restrictions typically require expensive hardware and software to be added to an otherwise inexpensive Ethernet network. Further, such protocols typically require the use of manually created address tables for the routers.

II. Ethernet

Ethernet has become a common protocol for local area networks and is in wide use due to the advantages described above. For purposes of this specification, the terra "Ethernet" includes the entire class of Carrier Sense Multiple Access/Collision Detection (CSMA/CD) protocols covered by the family of computer industry standards known variously as IEEE-802.3 and ISO 8802/3. This includes but is not limited to 1-megabit Ethernet, known as "StarLAN", 10-megabit Ethernet, 100-Megabit Ethernet, known as "Fast Ethernet", 1-gigabit Ethernet, known as "Gigabit Ethernet" and any future CSMA/CD protocols at any other data rates.

Originally, Ethernet was designed as a half-duplex broadcast system with a data bus that carries data packets at a rate of approximately 10 Megabits per second to and from terminals. Each terminal connected to an Ethernet can either transmit to or receive from all other terminals on the network ("Multiple Access", the "MA" in CSMA/CD), but, in the original Ethernet, may not transmit and receive at the same time. Further, Ethernet was designed as a network with no central control over which terminal has access to the data bus at a given time. Ethernet was based on the probabilistic principle that two terminals rarely will transmit at the same time and that each terminal first "listens" to the bus to see if another terminal is already transmitting ("Carrier Sense", the "CS" in CSMA/CD). This is in contrast to Token Ring and FDDI systems where deterministic control is administered by Tokens and ATM (Asynchronous Transfer Mode) networks and routers where central deterministic control is handled by either an ATM switch or the routers through special inter-router protocols.

When two terminals attempt to transmit at the same time, there is a collision. The terminals that are involved detect the collision ("Collision Detection", the "CD" in CSMA/CD) by monitoring the data bus for a collision signal or corrupted data packets on the bus after a transmission. In order for all the terminals that have transmitted to realize there is a collision, all the terminals must receive all the packets and collision signals involved. Therefore, the network cannot be any larger than half the distance that the smallest packet will cover from start to finish. At 10 Megabits per second, a 64-byte packet, the minimum Ethernet packet, takes 51.2 microseconds from start to finish. Therefore, a local area network can be no larger than the distance a packet will travel in 25.6 microseconds, including any propagation delays from equipment in the network. At 100 Megabits per second, a 64-byte packet takes 5.12 microseconds from start to finish. Therefore, a local area network can be no larger than the distance the packet will travel in 2.56 microseconds, including any propagation delays from the equipment. When the collision is detected, each of the terminals will wait a random amount of time before attempting to retransmit its packet so as to avoid further collisions on the network. This is in contrast to Token Ring, FDDI, ATM and routers, which because of the centralized deterministic control administered through the use of Tokens and additional protocols do no allow collisions and can therefore transmit data over much longer distances.

The Ethernet, as do all the other network protocols, transmits in packets. These data packets include a source address, a destination address, the data being transmitted, and a series of data integrity bits commonly referred to as a cyclical redundancy check or CRC. The source address identifies the device that originated the packet and the destination address identifies the device to which the packet is to be transmitted over the network.

Full-duplex Ethernet was developed more recently to eliminate the timing restrictions of half-duplex Ethernet by having separate transmit and receive channels between two terminals. In this manner, since the transmit channel is only transmitting to a single receiver, which never receives transmissions from any other transmitter, there can never be a collision. Full-duplex Ethernet requires each Ethernet device to have additional buffer memories and logic for storing transmit packets and receive packets simultaneously. The classical Ethernet hub with multiple ports that can transmit packets to and from other switches or terminals cannot handle full duplex Ethernet. The original Ethernet switches were also not able to handle full duplex Ethernet, but the most recent Ethernet switches on the market have the additional buffer memories and logic available at one or more of their Ethernet ports to allow one or more of these ports to be operated in full duplex mode.

To switch data packets from an incoming port to a specified terminal, the Ethernet switch needs to know which port on the switch is connected to a path to the terminal. Conventionally, an Ethernet switch "self-learns" the identity of the terminals attached or associated with each port of the switch. Each switch port records the source address of every packet, as it receives the packet, in a memory table for that port.

Further, when a packet is received at a port of the switch, the destination address of the packet is compared to the memory tables for the other ports of the switch. When a match is found for the destination address in the tables for one of the ports, the packet is switched to and sent out that port. If, however, the packet is a "broadcast packet", i.e. one having the hexadecimal destination address of FFFFFF, the packet is broadcast to the other ports on the switch, but never back to the original receiving port. Moreover, if there is no match for a non-broadcast, or uni-cast destination address, the switch may assume that this is the first packet to go to a new terminal through this switch. Since the location of the terminal is unknown, the packet may be broadcast to the other ports on the switch, but never back to the original receiving port. Similarly, one can have "multicast" packets using specially reserved destination address. Such packets will be broadcast to a selected group of devices.

Although not a part of the Ethernet protocol, but of commonly used higher level protocols (e.g. TCP/IP), if the broadcast or uni-cast packet arrives at its intended destination, the destination device normally responds with an acknowledgment packet back to the switch that broadcast the packet. When the acknowledgment packet arrives at the switch, the switch enters the source address of the acknowledgment packet from the destination terminal into the memory table for that port so as to record the association of the destination terminal with the port in the switch. In this manner, subsequent packets sent to that station will be switched to the correct port of the switch.

III. Problems with a Unidirectional Ring of Conventional Ethernet Switches

Conventional Ethernet switches, like all other Ethernet devices cannot be configured in a unidirectional ring network. One could imagine one possible configuration in which each switch would use one port to receive packets from the ring (the "ring-in port"), one port to place packets onto the ring (the "ring-out port"), and one or more local ports connected to local area networks. This configuration would lead to at least two problems when conventional Ethernet switches are used.

First, an Ethernet packet with a broadcast address, multicast address, or an invalid address, e.g., for a terminal not associated with the ring network, will travel indefinitely around the ring network due to the manner in which the Ethernet switches process packets with unknown destination addresses. As described above, if a conventional Ethernet switch does not find the destination address of a packet in a table for a port of the switch, the packet is broadcast out of each port of the switch, including the ring-out port. Since the address is invalid, each switch in the ring network will, in turn, broadcast the packet out of its ring-out port. Thus, the packet will travel indefinitely around the ring network.

Further, in such a unidirectional ring network, the switches will attempt to transmit some packets out of the ring-in port of the switch. As described above, a conventional Ethernet switch uses the source address of the packet received at a port to build a table for the port. This table indicates to the switch the terminals that can be reached through the port. In a unidirectional ring network, when a packet enters a switch through the ring-in port, the switch associates the terminal that sent the packet, e.g., device A, with the ring-in port. Thus, when the switch receives a packet, from a local port that is destined for device A, the switch attempts to transmit the packet out the receive-only, ring-in port rather than sending it out the ring-out port.

Alternatively, one might try to connect switches in a unidirectional ring using one port per switch. In this configuration the receive circuit of a full duplex Ethernet port would be connected to receive packets from the ring and the transmit circuit of the: same full duplex Ethernet port would be connected to send packets around the ring to the next switch. This however, conflicts with one of the basic Ethernet rules: if a destination address of a packet received at a port is the same as a source address in the table for that port, then the packet is dropped. This is referred to as the "Destination Address Filtering" rule. Application of the Destination Address Filtering rule in a ring of conventional Ethernet switches as just described would mean that once the port of the switch had learned all the source addresses of the other terminals on the ring, that no packet originating from a prior switch on the ring, and destined for a subsequent switch on the ring, would be permitted to enter the switch so that it could be forwarded around the ring to the next switch. Moreover, a second basic rule of Ethernet, that no packet is ever transmitted out on the port from which it was received, would mean that even if the packet from the prior switch was able to enter the receive circuit, it would never be transmitted back out that port onto the ring to go to the subsequent switch. We might note here, that trying either of these approaches with a conventional Ethernet hub leads to all the same problems and more since the hub design broadcasts every packet all the time.

Some companies have tried to circumvent these problems by encapsulating Ethernet packets for transmission using different custom protocols. However, these techniques add substantial complications to the equipment, essentially emulating Token Ring or FDDI networks and therefore add substantial costs. Furthermore, these techniques lose many of the benefits of an Ethernet system. The more common technique for connecting Ethernet LANs in a ring is to use Routers that convert Ethernet packets to Token Ring, FDDI or other ring oriented packets. This technique can involve both encapsulating the Ethernet packet in another type of packet, requiring special higher level protocol information to be included in the data field of the Ethernet packet for purposes of directing the router, and require the user of such equipment to manually program the routing address tables.

For the reasons stated above, and for other reasons stated below which will become apparent to those skilled in the art upon reading and understanding the present specification, there is a need in the art for a ring network which is transparent to the data and protocols contained in data packets, self learns the locations of all devices without manual intervention, is simple and low cost to implement.

SUMMARY OF THE INVENTION

The above mentioned problems with ring networks and other problems are addressed by the present invention and will be understood by reading and studying the following specification. Systems and methods are described which are used with a ring network.

In particular, in one embodiment, a ring network for transporting data packets between network devices is provided. The ring network includes a number of ring switches. Each ring switch has at least one ring port, at least one local port and at least one address table that self learns which network devices are associated with each port of the ring switch based on source addresses of packets processed by the ring switch. The at least one ring port of each ring switch is coupled to a ring port of another ring switch in the ring network. The ring switch switches data packets between its ring and local ports to direct the data packets to specified network devices associated with the at least one local port of the ring switches in the ring network. The ports of the ring switches are configured such that data packets received at the at least one ring port and the at least one local port that are not destined for a network device associated with the at least one local port of the ring switch are switched to another ring switch on the ring network based on the at least one address table without the use of a token or encapsulating the packet. In another embodiment, the ring switches store source addresses for data packets received at a ring-in port of a ring switch in the at least one address table with an indication that data packets destined for the source address should be transmitted out a ring-out port of the ring switch. In another embodiment, the ring switches each include a single, bi-directional ring port that allows data packets received at the bi-directional ring port to be retransmitted out the ring port of the switch so that data packets can be forwarded on to other ring switches in the ring network without the use of a token or encapsulating the data packets. In another embodiment, the ring switches are coupled by conductors on a printed circuit board. In another embodiment, the ring switches include a circuit that removes incoming data packets that have a source address that corresponds to a network device associated with the local port of the switch.

In another embodiment, a ring switch for a ring network is provided. The ring switch includes at least one ring port that is coupleable to transport data packets in a ring network. Further, the ring switch includes at least one local port that is coupleable to at least one local area network. The ring switch also includes at least one address table that tracks the addresses of network devices associated with each port of the ring switch based on source addresses of data packets received at the ports of the ring switch. Data packets received at the at least one ring port that are not destined for a network device associated with any of the at least one local ports of the ring switch are switched to another ring switch coupled to the at least one ring port based on the at least one address table without the use of a token or encapsulating the packet.

In another embodiment, a ring switch for a ring network is provided. The ring switch includes a bi-directional ring port that is coupleable to receive data packets from and transmit data packets over a ring of ring switches. The ring switch also includes at least one local port that is coupleable to at least one local area network. Further, the ring switch also includes at least one address table that self learns and stores the addresses of network devices associated with the at least one bi-directional ring port and the at least one local port based on source addresses from data packets processed by the ring switch. The ring switch allows data packets received at the ring port to be retransmitted out the ring port of the switch so that data packets can be forwarded on to other ring switches in the ring network based on the at least one address table without the use of a token or encapsulating the packet. A circuit associated with the bi-directional ring port removes incoming data packets that have a source address that corresponds to a network device associated with the at least one local port of the switch.

In another embodiment, a ring switch for a ring network is provided. The ring switch includes a ring-in port that is coupleable to receive data packets from the ring network. Further, the ring switch includes a ring-out port that is coupleable to provide data packets to the ring network. The ring switch also includes at least one local port that is coupleable to a local area network. Finally, the ring switch includes at least one address table to track the addresses of network devices associated with the ports of the ring switch. The address table associates the addresses of network devices with the ring-out port when data packets are received at the ring-in port.

In another embodiment, a method for building an address table for a port of a ring switch in a ring network is provided. The method includes receiving a data packet at a first port of the ring switch. The method then reads the source address from the data packet and stores the source address in an address table for the ring switch that indicates that the data packet originated from a network device associated with a second, different port of the switch so as to allow unidirectional transmission on the ring network.

In another embodiment, a method for removing data packets from a ring network is provided, the method includes receiving a data packet at a ring port of a ring switch of the ring network. The source address is read from the data packet and compared with the at least one address table of the ring switch. The at least one address table indicates which addresses are associated with each port of the switch. When the source address corresponds to a network device that is associated with a local port of the switch, the method discards the data packet.

In another embodiment, a method for processing data packets in a ring switch of a ring network is provided. The method includes receiving a data packet at a bi-directional ring port of the ring switch. The source address of the data packet is read. When the source address is not in an address table for a port of the ring switch, the source address is stored in at least one address table with an indication that the address is for a network device associated with the ring port. The method also reads a destination address from the data packet. When the destination address for the data packet is in an address table for the ring switch, the method switches the data packet to the port of the ring switch that is associated with the destination address, even if the data packet was received at the ring port and the destination address is associated with the ring port without using a token or encapsulating the data packet. When the destination address for the data packet is not in an address table for the ring switch or the data packet is a broadcast data packet, the method broadcasts the data packet to all ports of the ring switch. Finally, when the destination address for the data packet is a multicast address, the method broadcasts the data packet to all appropriate ports of the ring switch.

In another embodiment, a method for processing data packets in a ring switch of a ring network is provided. The method includes receiving a data packet at a ring-in port of the ring switch. The source address of the ring packet is read. When the source address is not in an address table for a port of the ring switch, the source address is stored in the address table with an indication that the address is for a network device associated with a ring-out port of the ring switch. The destination address from the data packet is also read. When the destination address for the data packet is in an address table for the ring switch, the data packet is switched to the port of the ring switch that is associated with the destination address. When the destination address for the data packet is not in an address table for the ring switch or the data packet is a broadcast data packet, the data packet is broadcast. Finally, when the destination address for the data packet is a multicast address, the data packet is broadcast to all appropriate ports of the ring switch.

BRIEF DESCRIPTION OF THE DRAWINGS

FIG. 3 is a block diagram of a ring switch according to the teachings of the present invention.

FIG. 5 is a block diagram of an embodiment of a modified Ethernet switch according to the teachings of the present invention.

DETAILED DESCRIPTION

Figure 1:
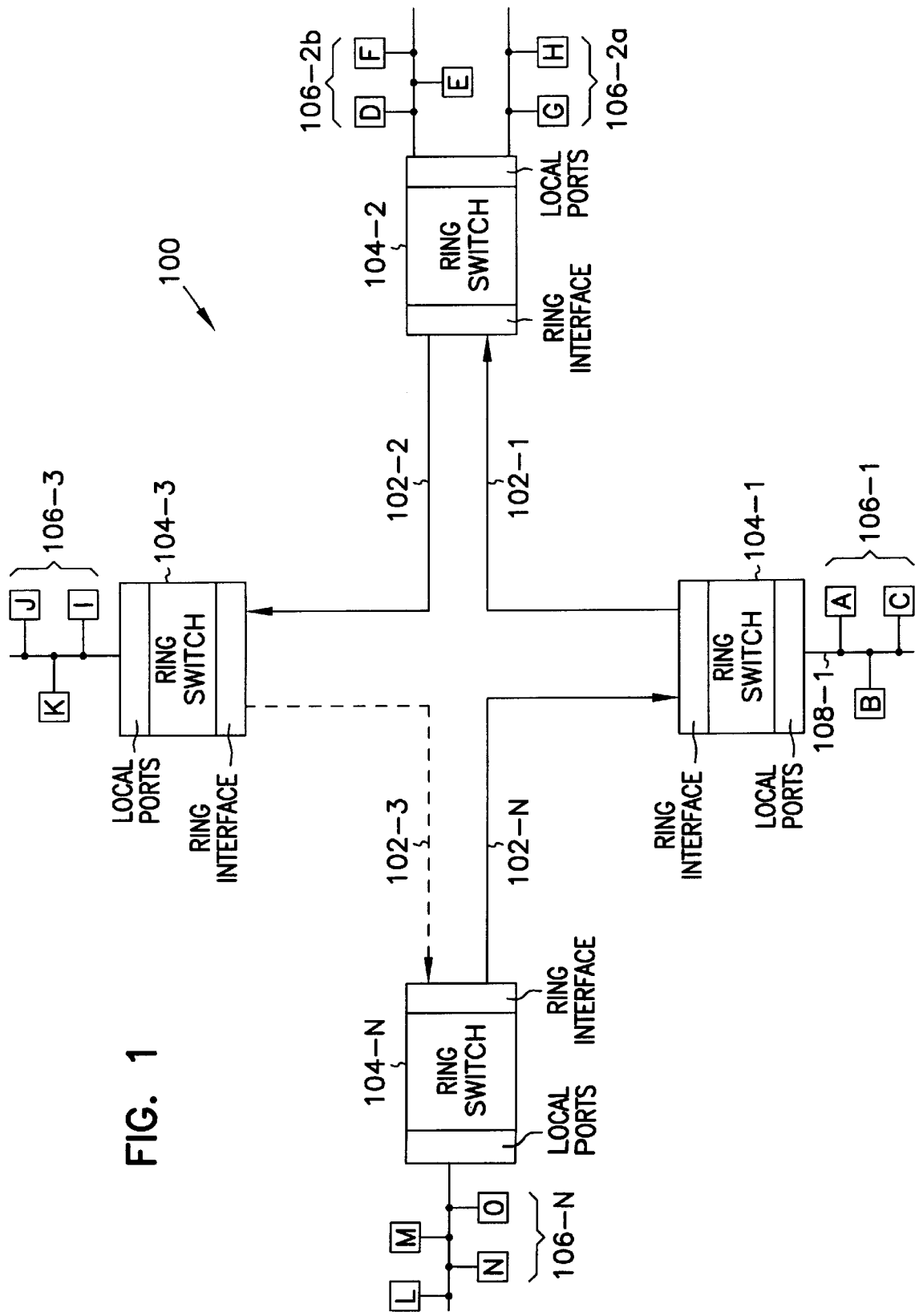
FIG. 1 is a block diagram of an embodiment of a ring network according to the teachings of the present invention.

FIG. 1 is a block diagram of an embodiment of a system, indicated generally at 100, for transmitting data packets in a unidirectional ring network. For purposes of this specification, the term data packets includes Ethernet, Token Ring, FDDI, Asynchronous Transfer Mode ("ATM") and other data packets with a format that includes at least a source address, a destination address, payload data, and, optionally, an error correction code such as a cyclical redundancy check. Further, the term "Ethernet" includes the entire class of Carrier Sense Multiple Access/Collision Detection (CSMA/CD) protocols covered by the family of computer industry standards known variously as IEEE-802.3 and ISO 8802/3. This includes but is not limited to 1-megabit Ethernet, known as "StarLAN", 10-megabit Ethernet, 100-Megabit Ethernet, known as "Fast Ethernet", 1-gigabit Ethernet, known as "Gigabit Ethernet" and any future CSMA/CD protocols at any other data rates. Advantageously, system 100 allows conventional data packets to be transmitted in a unidirectional ring network without the substantial complications involved with encapsulation and token protocols used in conventional ring networks. System 100 operates on data packets independent of the data rate and particular data packet protocol used. System 100 also overcomes the problems identified above with respect to trying to use conventional Ethernet switches, hubs or other devices in the ring network.

System 100 includes a number of ring switches 104-1 through 104-N that each self-learn which network devices are associated with the various ports of the ring switch. Each ring switch includes one or more local ports which are coupled to local networks. The local ports can include ports that are configured for use with Ethernet, Token Ring, ATM, FDDI or other appropriate network protocol. For example, ring switch 104-1 includes at least one local port that is coupled to local area network (LAN) 106-1. Local area network 106-1 includes network devices A, B, and C that are coupled to common bus 108-1. As used in this specification, the term "network devices" includes, but is not limited to, hubs, computer terminals and workstations, routers, switches, gateways and other devices that are conventionally coupled in a network.

It is noted that ring switch 104-2 has two local area networks, 106-2a and 106-2b, coupled to its local ports. This illustrates that the ring switches can support multiple local area networks, which may be substantially more than two.

Ring switches 104-1 through 104-N are coupled together by a transmission medium that interconnects the ring interfaces of the ring switches to form the ring of system 100. As shown in the embodiment of FIG. 1, ring switches 104-1 through 104-N are coupled in a ring by wires 102-1 through 102-N. Wires 102-1 through 102-N may comprise, for example, twisted pair wires, coaxial cable, a conductor on a printed circuit board, an internal connection between subsections of a single integrated circuit, fiber optic cable, wireless connection, or other appropriate medium for transmitting data packets between the ring switches in system 100. In this way, system 100 could be used as a low cost way to increase the number of available local ports of a conventional Ethernet switch.

Figure 11:
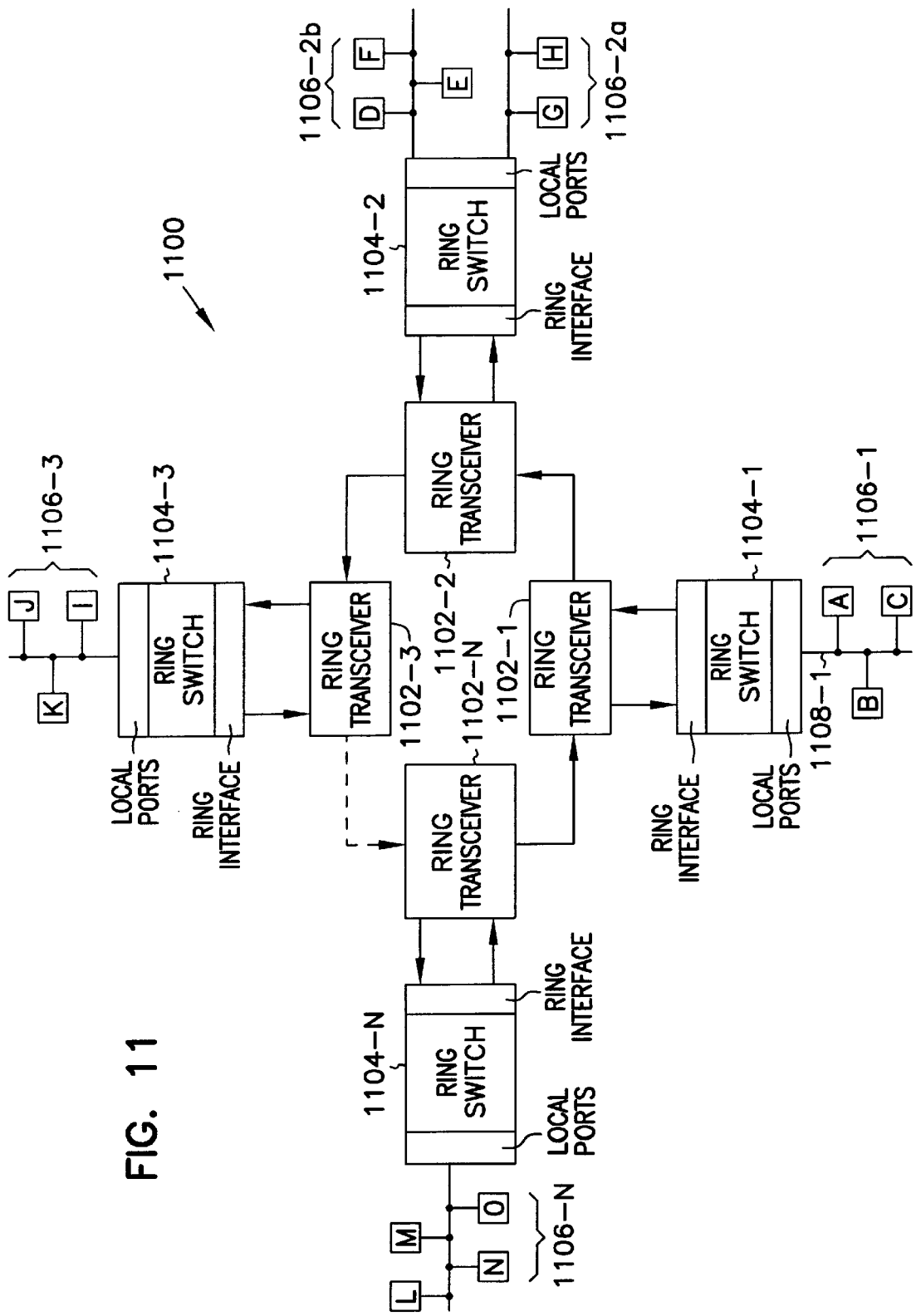
FIG. 11 is a block diagram of another embodiment of a ring network according to the teachings of the present invention.

In an alternative embodiment shown in FIG. 11, ring transceivers 1102-1 through 1102-N are coupled to form a unidirectional ring for transmitting Ethernet packets between ring switches of system 1100. Ring switch 1104-1 through 1104-N are associated with ring transceivers 1102-1 through 1102-N, respectively. Ring transceivers 1102-1 through 1102-N may comprise, for example, a number of DV6000 fiber transport systems available from ADC Telecommunications of Minnetonka, Minn. The DV6000 provides 16 channels of capacity for transporting data. In this embodiment, only one channel of the DV6000 is used to transmit the Ethernet packets in system 1100. The other channels may be used for additional ring switch networks or other purposes, e.g., video, voice or other data transmission. Alternatively, ring transceivers 102-1 through 102-N may be implemented with other conventional transport mechanisms such as, for example, wireless transceivers, fiber optic transceivers, etc.

Advantageously, ring switches 104-1 through 104-N of system 100 use a method that prevents packets from being transmitted around the ring network indefinitely. According to one embodiment, a ring switch reads the source address of packets as they enter the ring interface for the ring switch. If the source address of the packet received at the ring interface corresponds to the address of a network device associated with the local ports of the ring switch, the method removes the packet from the ring and discards it. This means that a packet that originated from a network device associated with the local ports (e.g., network device A, B, or C for ring switch 104-1) has passed completely around the ring of system 100 and arrived back at the ring-in port of the originating ring switch. This method allows a ring switch to remove a packet because the destination address for the packet originating from a network device associated with one of its local ports was not found in system 100.

In another embodiment, an identification number for each switch is used to prevent packets from indefinitely circling the ring network. When a packet enters a ring switch from a local port, an identification number for the ring switch is appended, pre-pended or added to the packet. When packets are received at the ring interface of a ring switch, the ring switch looks at the identification number for the packet. If the identification number indicates that the packet originated from this ring switch, then the packet is removed from the system. In another embodiment, a counter is appended to the packet at its originating ring switch. Each subsequent ring switch in the network that processes the packet increments the counter for the packet. Further, each ring switch that processes the packet checks the value of the counter. If the value of the counter exceeds an assigned threshold, then the packet is removed. The maximum value for the counter is selected so that the packet is removed from the ring when it has circled the network at least once.

Ring switches 104-1 through 104-N also use a modified method for processing data packets at the ring interface that allows proper processing of packets without loss of data. In one embodiment, the ring interface for each ring switch includes two ports: a ring-in port and a ring-out port. Basically, the ring switch builds an address table for the ring-out port based on the source addresses for packets received at the ring-in port. This is so that packets destined for network devices associated with local ports of other ring switches in system 100 will go out of the ring-out port and travel around the ring and be switched to a local port of the appropriate ring switch. In this manner, the ring switch learns that all network devices in system 100 that are not associated with local ports of the switch can be reached only through the ring-out port and not through the ring-in port. It is noted that in each of these embodiments, the ring switch may maintain either multiple address tables or a single address table for all of the ports of the ring switch or a separate table for each of the ports. In the case with a single address table and possibly in the case of multiple address tables, the ring switch uses a number of bits associated with each address in the table to indicate the port associated with the address.

In another embodiment, the ring interface of each ring switch includes a single bidirectional ring port as shown in FIG. 3. To eliminate the problem of lost data, in this embodiment, the method uses normal address tables and address learning techniques, but allows packets received at the ring port also to be transmitted out the ring port in violation of the conventional rule for Ethernet switches that a packet cannot be switched out on the port from which it was received. In this embodiment, the rule of Destination Address Filtering is also suspended so that packets originating from a prior ring switch on the ring, and destined for a subsequent ring switch on the ring, can be received by intermediate switches.

Figure 2:
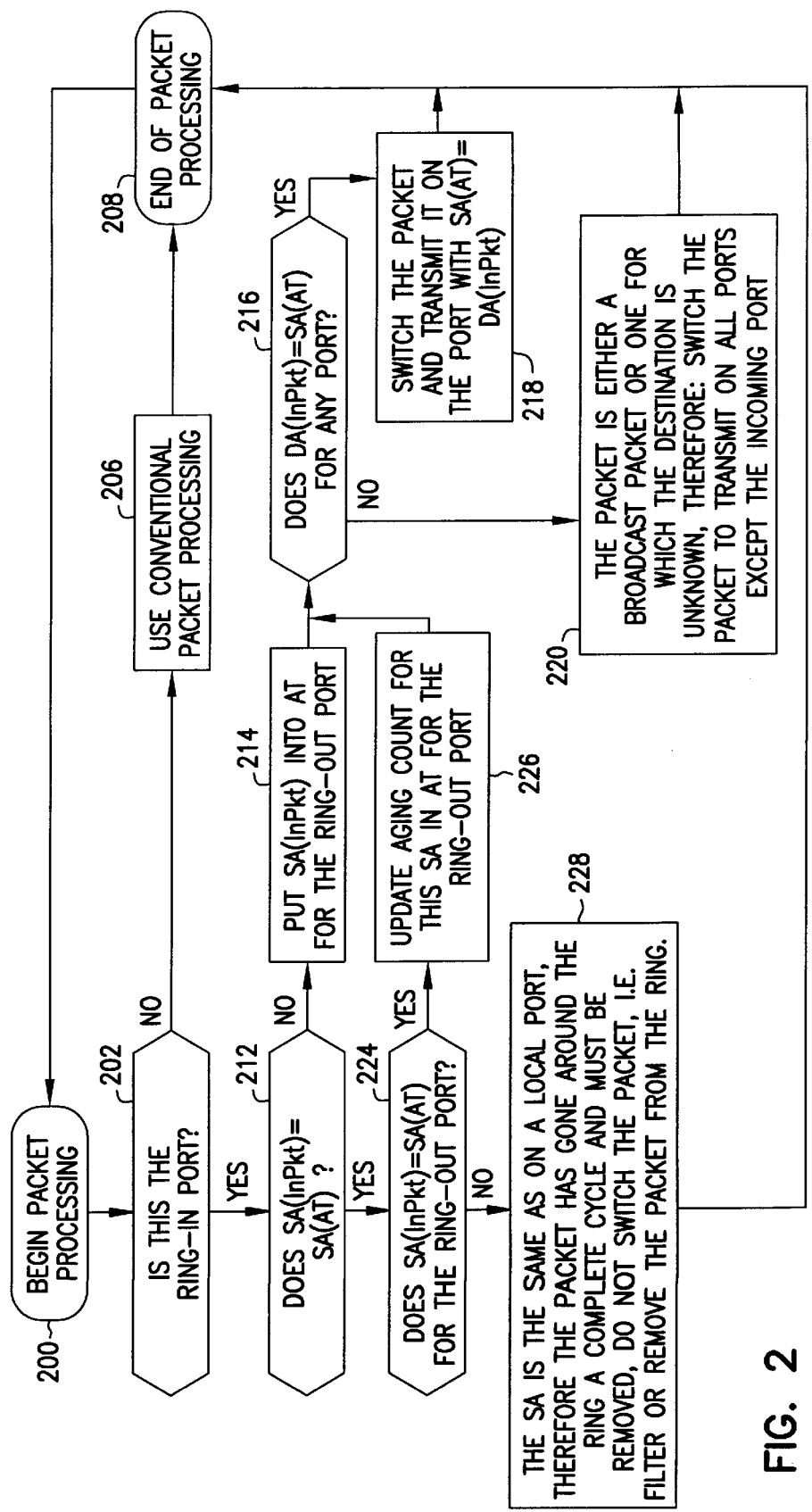
FIG. 2 is a flow chart for an embodiment of a method for processing data packets in a ring network according to the teachings of the present invention.

FIG. 2 is a flow chart that illustrates a first embodiment of a method for processing data packets in a ring network according to the teachings of the present invention. This method implements the technique of creating an address table for a ring-out port of a ring switch based on the source address of data packets received at a ring-in port. The method also checks the source address of incoming packets against address tables for the one or more local ports of the Ethernet switch to remove packets originating from the local ports that have traveled around the ring network. The following table provides definitions for the abbreviations used in FIGS. 2 and 4.

| Abbreviation | Definition |
| --- | --- |
| DA | Destination Address |
| SA | Source Address |
| AT | Address Table |
| SA(AT) | Source Address in the Address Table |
| SA(InPkt) | Source Address in the data packet being processed |
| DA(InPkt) | Destination Address in the packet being processed |

The method begins processing an incoming data packet at block 200. The first factor used by the method is to determine which kind of port has received the data packet. The method processes the data packets differently based on whether the incoming data packet is received at the ring-in port or a local port. Thus, at block 202, the method determines whether the switch received the incoming data packet at the ring-in port. If the data packet is received at a local port, the method proceeds to block 206 and uses conventional switching techniques to process the data packet. The method then ends the processing of the data packet at block 208.

If the data packet was received at the ring-in port, the method proceeds from block 202 to block 212 and uses modified techniques to address the problems identified above with respect to processing data packets in a ring network. The method first determines whether the switch has handled data packets for this network device before. The method does this by looking for the source address of the incoming data packet in the at least one address table or tables for the ports of the ring switch. If the source address is not in one of the address tables, the method proceeds to block 214 and places the source address for the incoming data packet into the table for the ring-out port even though the data packet was received at the ring-in port. This way, future data packets processed by the ring switch that are destined for the network device that originated the data packet will be transmitted out onto the ring network at the ring-out port to be switched out to the network device at the local port of its ring switch.

The method next turns to determining where to switch this data packet. At block 216, the method determines whether the destination address of the incoming data packet is in the address tables for any port of the ring switch. If the destination address is in one of the at least one address tables, the method switches the data packet from the ring-in port to the port indicated in the address table. The method then ends the processing of this data packet at block 208.

At block 216, if the destination address for the data packet is not in the address table for one of the ports of the ring switch, the method broadcasts the data packet on all ports except the ring-in port. The method ends the processing of this data packet at block 208.

If at block 212, the method determines that the source address is known to the ring switch, the method proceeds to block 224. At block 224, the method determines whether the source address for the incoming data packet is in the address table for the ring-out port. If so, the method proceeds to block 226 and updates the aging count for the source address in the address table for the ring-out port. The method proceeds on to block 216 to finish processing the data packet as described above.

If at block 224, the method determines that the incoming data packet is not from a network device associated with the ring-out port, then the method proceeds to block 228 and filters out, truncates or otherwise eliminates the data packet. In this case, it is determined that the source address is an address table for a local port. This means that the data packet originated with a network device that is associated with a local port of this ring switch and has traveled around the ring network without being switched out to the network device designated by the destination address of the incoming data packet. Thus, the incoming data packet is either improperly addressed, a broadcast packet, or a multicast packet, and should be removed from the network.

Figure 4:
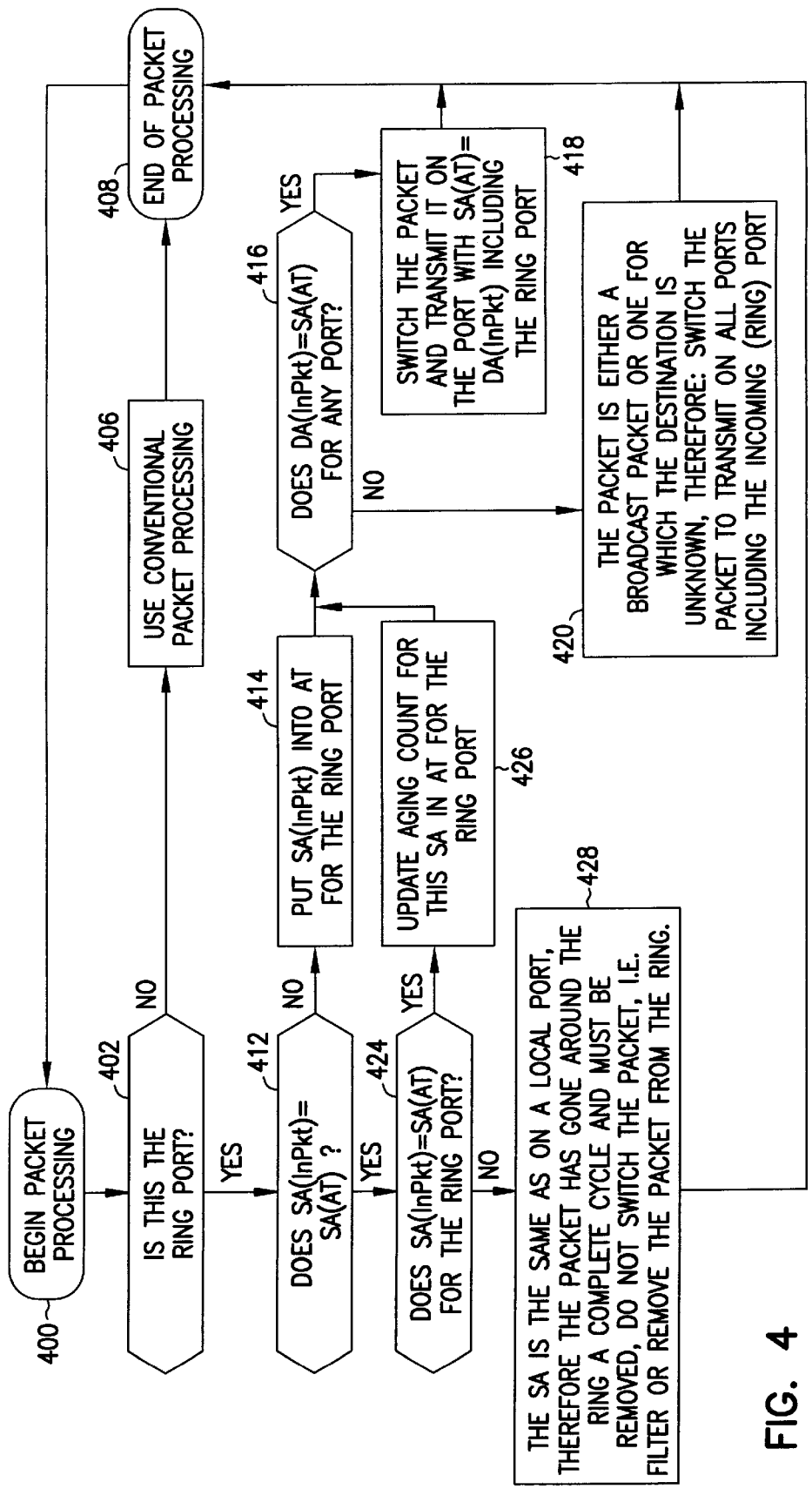
FIG. 4 is a flow chart that illustrates another embodiment of a method for processing data packets in a ring network according to the teachings of the present invention.

FIG. 4 is a flow chart that illustrates another embodiment of a method for processing data packets in a ring network according to the teachings of the present invention. This method implements the technique of using conventional self-learning functions, such as the type of self-learning used in conventional Ethernet switches, but allowing data packets to be transmit out from the ring port even when the data packet was received at the ring port to prevent loss of data. Thus, this method violates conventional rules of Ethernet packet processing that are used in every other known existing type of Ethernet device, and in particular the rules used in Ethernet switching. The method also checks the source address of incoming data packets against address tables for the one or more local ports of the ring switch to remove data packets originating from the local ports that have traveled around the ring network.

The method begins processing an incoming data packet at block 400. The first factor used by the method is to determine which kind of port received the incoming data packet. The method processes the data packets differently based on whether the incoming data packet is received at the ring port or at a local port. Thus, at block 402, the method determines whether the switch received the incoming data packet at the ring port. If the data packet is received at a local port, the method proceeds to block 406 and uses conventional switching techniques to process the data packet. The method then ends the processing of the data packet at block 408.

If the data packet was received at the ring port, the method proceeds from block 402 to block 412 and uses modified techniques to address the problems identified above with respect to processing data packets in a ring network. The method first determines whether the ring switch has handled data packets for this network device before. The method does this by looking for the source address of the incoming data packet in the address table for the ports of the ring switch. If the source address is not in the address table associated with one of the ports, the method proceeds to block 414 and places the source address for the incoming data packet into the table for the ring port as would be done in conventional Ethernet practices.

The method next turns to determining where to switch this data packet. At block 416, the method determines whether the destination address of the incoming data packet is in the address table for one of the ports of the ring switch. If the destination address is in the table for one of the ports, the method switches the data packet at block 418 from the ring port to the port with the address table that contains the destination address even if the destination address is in the table for the ring port. This violates conventional Ethernet rules but, in this case, advantageously allows ring switches to be configured in a ring network. The method then ends the processing of this data packet at block 408.

At block 416, if the destination address for the data packet is not in the address table for one of the ports of the ring switch, the method broadcasts the data packet on all ports including the ring port at block 420. The method ends the processing of this data packet at block 408.

If at block 412, the method determines that the source address is known to the ring switch, the method proceeds to block 424. At block 424, the method determines whether the source address for the incoming data packet is in the address table for the ring port. If so, the method proceeds to block 426 and updates the aging count for the source address in the address table for the ring port. The method proceeds on to block 416 to finish processing the data packet as described above.

If at block 424, the method determines that the incoming data packet is not from a network device associated with the ring port, then the method proceeds to block 428 and filters out, truncates or otherwise eliminates the data packet. In this case, it is determined that the source address is an address table for a local port. This means that the data packet originated with a network device that is associated with a local port of this ring switch and has traveled around the ring network without being switched out to the network device designated by the destination address of the incoming data packet. Thus, the incoming data packet is improperly addressed, a broadcast packet, or a multicast packet, and should be removed from the network.

FIG. 5 is a block diagram of an alternative embodiment of a ring switch, indicated generally at 500, for a ring network according to the teachings of the present invention. In this embodiment, external circuitry is used with conventional Ethernet switch 502 to implement methods to prevent data packets from being inadvertently dropped from the network and to filter out data packets that have traveled around the ring network without being switched out to a local port of one of the ring switches. In this embodiment, switch 502 is a Thunderswitch by Texas Instruments of Richardson, Tex., part no. TNETX3150 or a GT-48002 or GT-48002A Fast Ethernet Switch Controller by Galileo Technology of Karmiel, Israel. The Thunderswitch and Galileo switches are examples of Ethernet switches that have an interface port that enables those switching chips to be forced, or manipulated, via an external processor to suspend their conventional automatic address table self learning algorithms and allow the external processor to place addresses in the address table. In this embodiment, the external processor reads the source addresses that come in from the ring and writes those addresses in the address table with the port identification bits set, by the external processor, to the port identification bits for the ring-out port. Alternatively, switch 502 may comprise a conventional PM33351 FastEtherDirector Ethernet switch from PMC-Sierra, Inc. of Burnaby, BC, Canada. With this embodiment, the PM3351 switch can be reprogrammed so as to disable the Destination Address Filtering function for a port so as to allow data packets to be transmitted out the same port from which the data packets arrived. In this embodiment, switch 502 would have a single ring port such as shown in FIG. 3. Other conventional Ethernet switches that can be reprogrammed can be substituted in place of the Thunderswitch, Galileo and PMC-Sierra switches. The use of a reprogrammed Thunderswitch, Galileo, PMC-Sierra switch or their equivalents solves one of the problems with conventional ring switches in a ring network; namely loss of data packets due to the ring nature of the network. The additional circuitry shown in FIG. 5 is used to implement the source address filtering function that prevents data packets from being transmitted around the network indefinitely. This circuitry in FIG. 5 is shown with switch 502 having ring-in and ring-out ports. It is understood that the external circuitry works equally well with a switch with a bi-directional ring-port.

Basically the external circuitry of ring switch 500 is used to deduce the addresses from incoming data packets that correspond to network devices associated with the local ports of switch 502 based on the stream of data packets coming into the ring-in port and out of the ring-out port. These addresses are placed in external address table (EAT) 504 of ring switch 500. Incoming data packets are compared against this address table to determine which data packets have traveled full circle around the ring and need to be dropped.

There are four basic scenarios for data packets processed by ring switch 500:

1. A data packet comes from the ring network into the ring-in port and does not come out the ring-out port. The destination address for this data packet corresponds to a network device on a local port and will be placed in external address table 504.
2. A data packet comes from a local port and is switched out the ring-out port of switch 502 to be placed onto the ring network. This data packet will only be in the outgoing data packet stream and thus its source address can be added to external address table 504.
3. A data packet comes from the ring and goes into switch 502 at the ring-in port and is transmitted back out onto the ring network at the ring-out port. The addresses of this data packet are not associated with a local port.
4. A data packet comes from the ring and its source address is the same as the source address for a local port and needs to be filtered out since it has traveled full circle around the ring network.

Switch 500 includes two state machines that receive data from the ring-in and the ring-out ports of switch 502 that can distinguish between each of these scenarios by generating and looking in external address table 504. First state machine 506 is coupled to receive data packets from the ring. First state machine 506 provides source addresses from incoming data packets to first-in, first-out (FIFO) buffer 510. Second state machine 512 uses the data in FIFO 510 and the data packets transmitted out the ring-out port to determine which addresses correspond to the local ports. Second state machine 512 places these address in, and maintains external address table 504.

Figure 7:
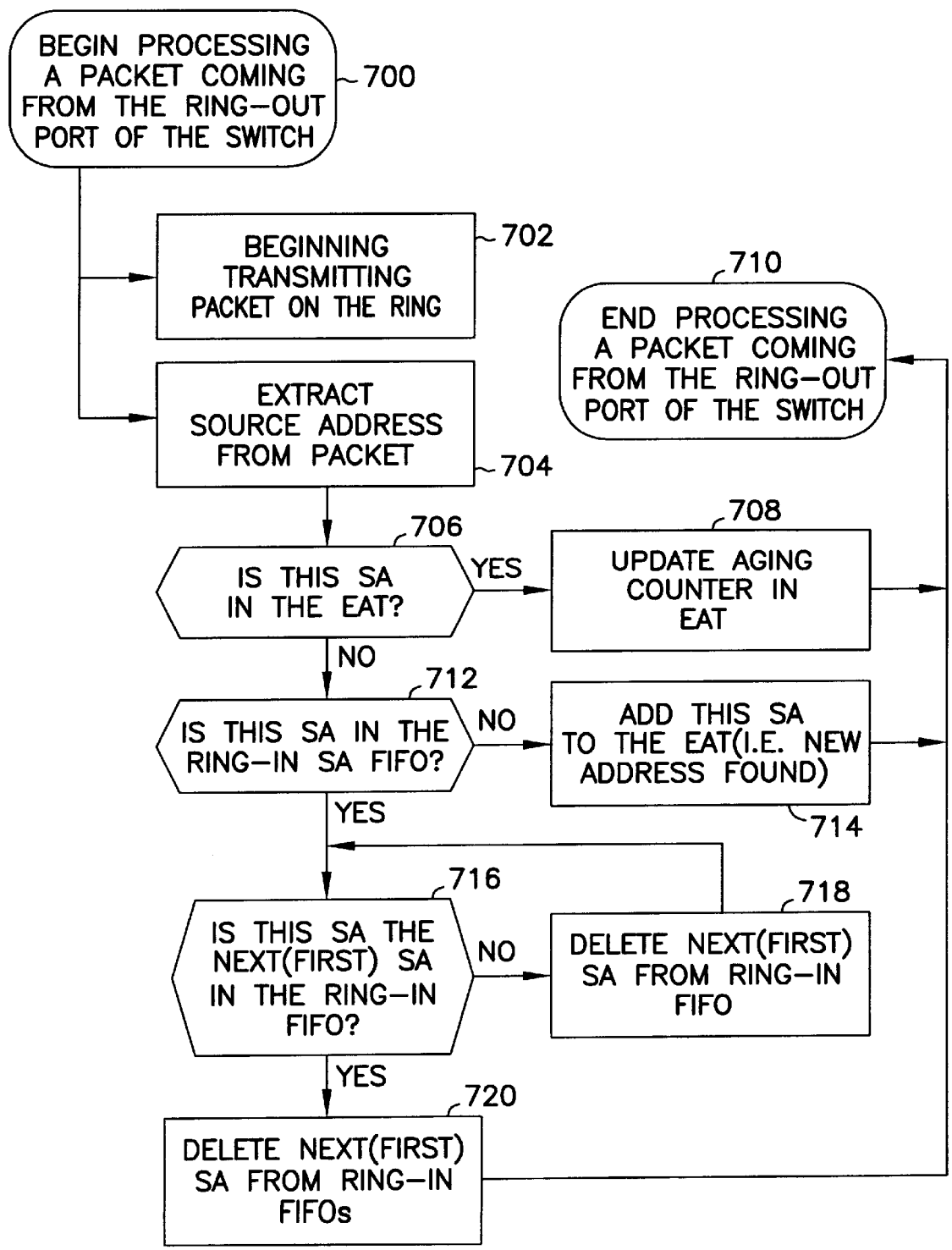
FIG. 7 is a flow chart that illustrates an embodiment of a method for learning the addresses of terminals associated with local ports of an Ethernet switch according to the teachings of the present invention.

FIG. 7 is a flow chart that illustrates an embodiment of a method for second state machine 512 of FIG. 5. This state machine is used to build and maintain the external address table for the network devices associated with the local ports of switch 502. The method begins at block 700. At block 702, the method begins transmitting a data packet onto the ring from the ring-out port of switch 502. At block 704, the method extracts the source address from the data packet. At block 706, the method determines whether the source address for the data packet is in EAT 504. If the source address is in EAT 504, the method proceeds to block 708 and updates an aging counter in EAT 504 and allows the data packet to be completely transmitted without interruption. The method then proceeds to block 710 and ends the processing of the data packet coming out of the ring-out port.

At block 706, if the method determines that the source address of the data packet coming out of the ring-out port is not in EAT 504, the method proceeds to block 712. At block 712, the method determines whether the source address taken from the data packet at the ring-out port is in FIFO 510. If not, the method proceeds to block 714 and adds the source address taken from the data packet at the ring-out port to EAT 504. This corresponds to the case of a data packet that originated with a network device associated with a local port of switch 502, i.e., the data packet came out of the ring-out port without entering the ring-in port. The method proceeds to block 710.

At block 712, if the method determines that the source address for the data packet is in FIFO 510 then the method proceeds to block 716. At block 716, the method determines whether the source address is the next source address to be taken out of FIFO 510. If the source address is not the next address in FIFO 510, then we know that at least one data packet terminated at a local address. Thus, the method proceeds to block 718 and deletes the next address from FIFO 510 and returns to block 716.

If at block 716, it is determined that the source address is the next address in FIFO 510, then the method proceeds to block 720 and deletes the next address from FIFO 510. This corresponds to the case where a data packet was passed through switch 502 from the ring-in port to the ring-out port.

Thus, according to this method, an address table that corresponds to the address tables for the local ports of switch 502 is maintained external to switch 502 so that data packets that have traveled around the ring network can be identified and filtered.

The same technique can be used with a switch identification number and hop counter. In this case the processing is the same. The FIFO will however be wider to accommodate in each logical location a series of bits that contain one or all of the source address, the switch identification number and the hop counter. If a hop counter is included it would be incremented by one at some point and tested as the first step upon being received from the ring.

Figure 6:
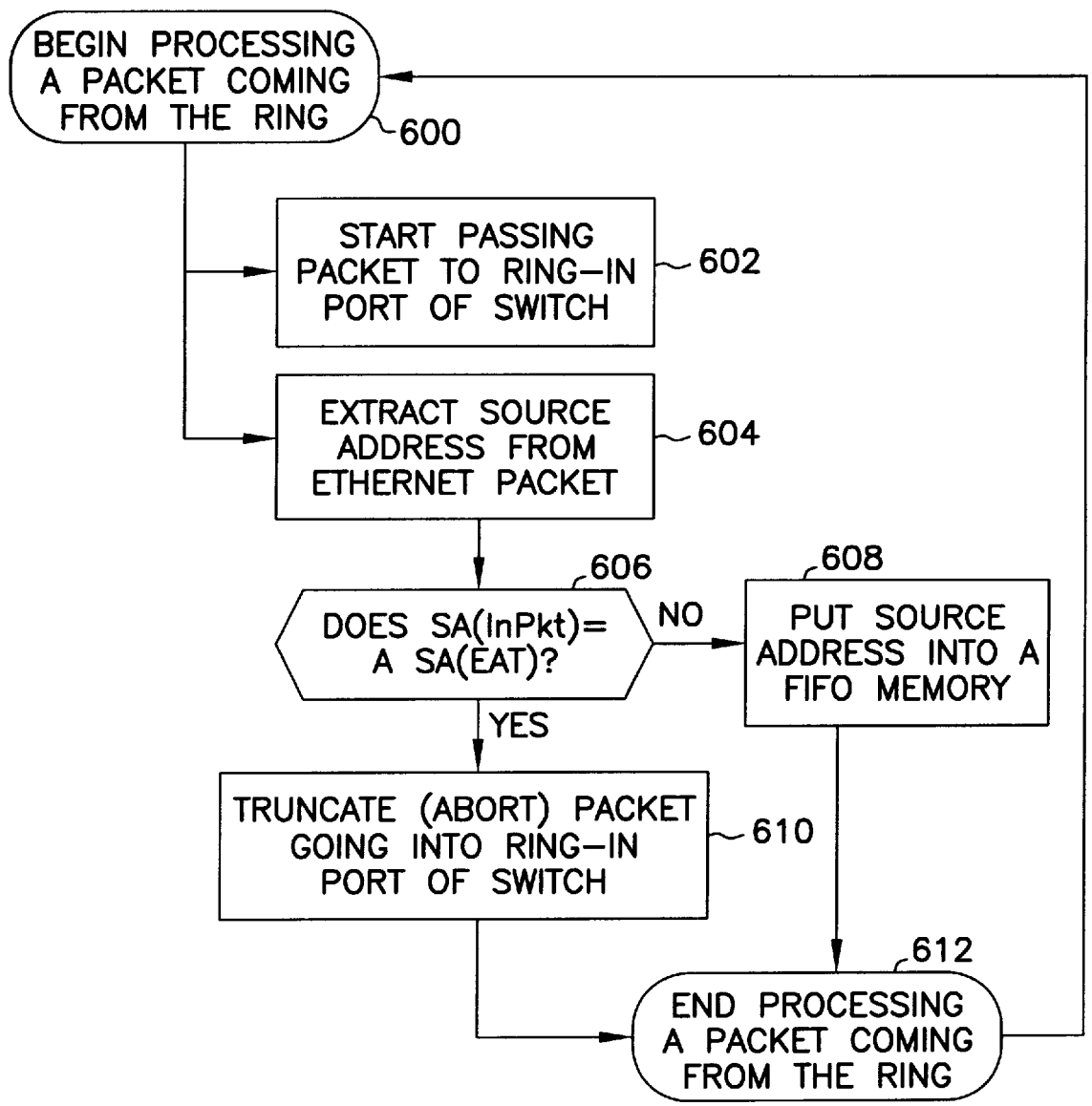
FIG. 6 is a flow chart that illustrates an embodiment of a method for identifying packets with invalid destination addresses according to the teachings of the present invention.

FIG. 6 is a flow chart of an illustrative embodiment of a method for first state machine 506 of FIG. 5 according to the teachings of the present invention. This state machine is used to determine when a source address of a data packet at the ring-in port of switch 502 corresponds to a network device associated with a local port of switch 502. The method begins at block 600. At block 602, the method starts passing a data packet to the ring-in port of switch 502. At block 604, the method extracts a source address from the data packet. At block 606, the method compares the source address of the incoming data packet with the addresses in EAT 504. If there is no match in EAT 504 for the source address of the data packet, the method proceeds to block 608 and places the source address into FIFO 510 and the entire data packet is transmitted into switch 502 without interruption. The method then ends processing the data packet at block 612 and returns to block 600 to process the next data packet.

At block 606, if the source address of the data packet is in EAT 504, the method. proceeds to block 610 and truncates (aborts) the data packet going into the ring-in port of switch 502. This prevents a data packet that originated from a local port of a switch from traveling indefinitely around the ring network.

Figure 8:
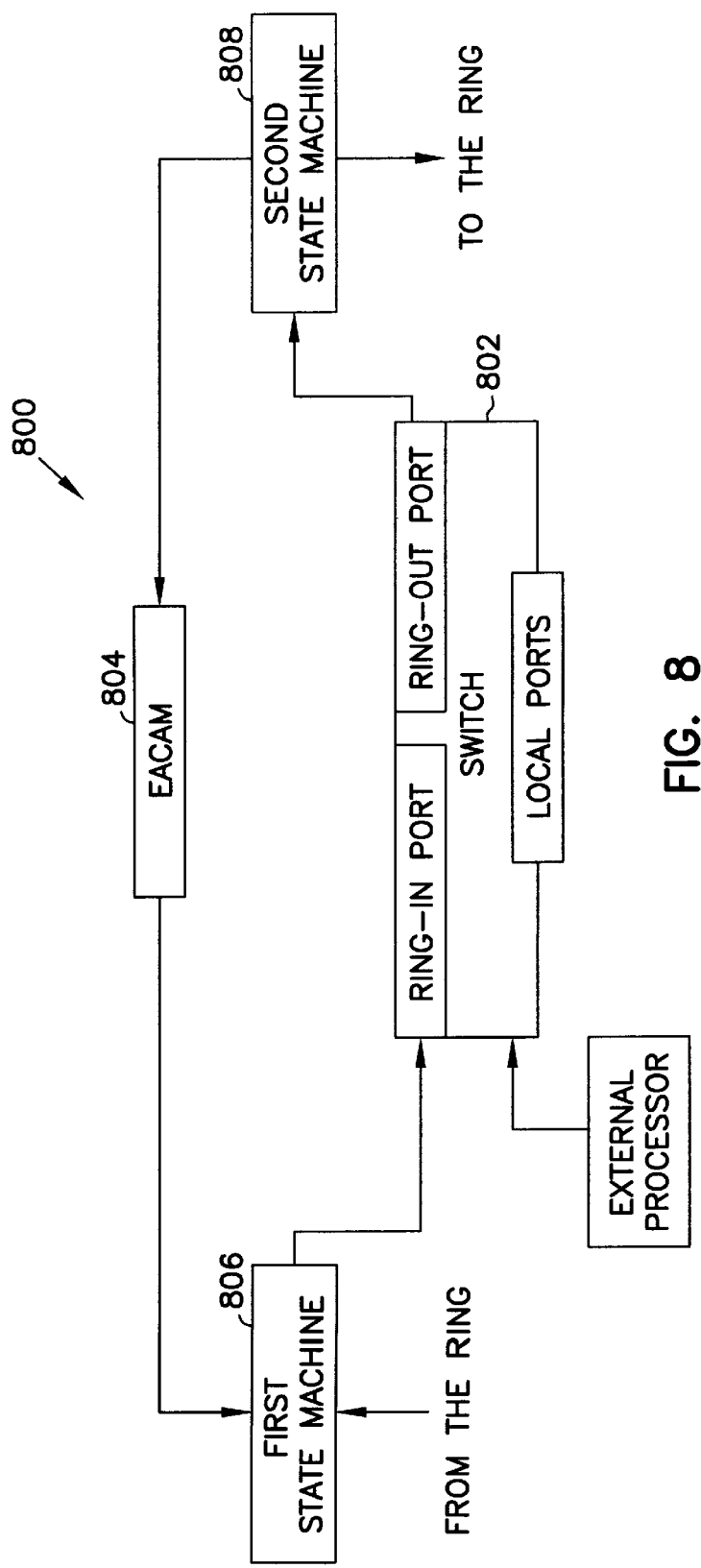
FIG. 8 is a block diagram of another embodiment of a modified Ethernet switch according to the teachings of the present invention.

FIG. 8 is a block diagram of an alternative embodiment of a ring switch, indicated generally at 800, and constructed according to the teachings of the present invention. This embodiment takes advantage of the fact that a primary goal of this method is to catch data packets that originated at a local port and have come full circle around the ring network and arrived at the ring-in port of the same ring switch. It also takes advantage of the fact that data packets coming out of the ring-out port can only come from one of two sources: a local port or the ring-in port. By tracking and comparing the addresses for data packets exiting the ring-out port and the addresses of data packets entering the ring-in port in an external address table implemented most easily in one or more Content Addressable Memories, EACAM 804, ring switch 800 can determine whether the addresses correspond to a local port. To this end, ring switch 800 includes switch 802 that may comprise a reprogrammed Ethernet switch such as, for example, a Thunderswitch chip by Texas Instruments, Galileo chip or PMC-Sierra chip switch of the varieties described above with respect to FIG. 5. Ring switch 800 includes first state machine 806 that is coupled to receive the data packets destined for the ring-in port of switch 802. Further, ring switch 800 includes second state machine 808 that is responsive to data packets from the ring-out port of switch 802. First and second state machines 806 and 808 build and maintain a table in EACAM 804 that indicates which ports are local ports so that first state machine 806 can remove data packets from the ring network that originated with a local port of switch 802 and traveled full circle around the ring network. The operation of first and second state machines 806 and 808 are described below with respect to FIGS. 9 and 10, respectively.

Figure 10:
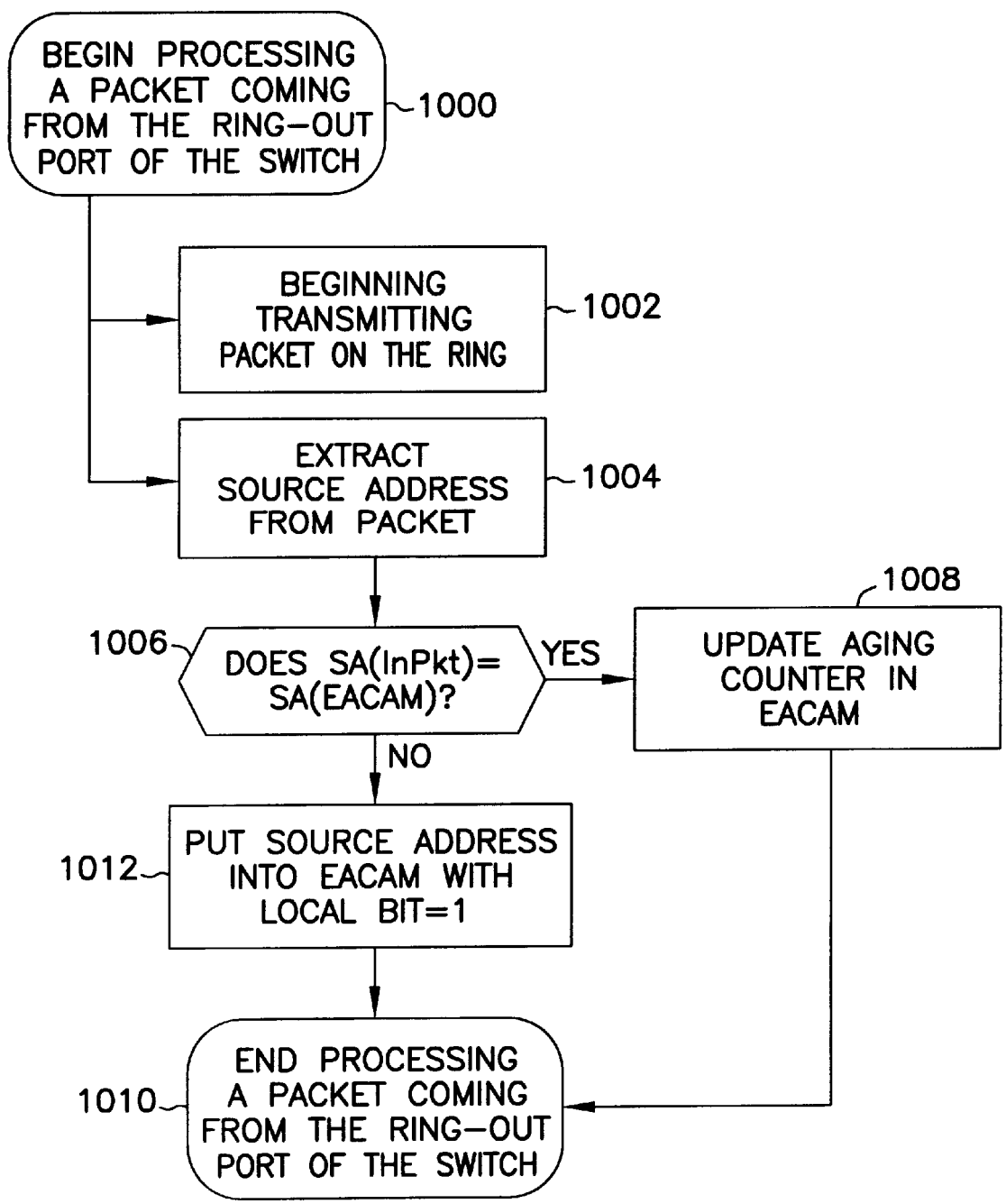
FIG. 10 is a flow chart that illustrates another embodiment of a method for learning the addresses of network devices associated with local ports of an Ethernet switch according to the teachings of the present invention.

FIG. 10 is a flow chart that illustrates one embodiment of a method for second state machine 808 of FIG. 8 according to the teachings of the present invention. The method begins processing a data packet block 1000. The method proceeds to block 1002 and begins transmitting the data packet on the ring network. At block 1004, the method extracts a source address from the data packet.

At block 1006, the method determines whether the source address of the data packet from the ring-out port of switch 802 is in the table of EACAM 804. If the address has already been stored in EACAM 804, the method proceeds to block 1008 and updates an aging counter in EACAM 804 for the address and allows the data packet to be completely transmitted without interruption. The method terminates the processing of the data packet at block 1010.

If, at block 1006, the source address for the data packet is not in EACAM 804, the method proceeds to block 1012. In this case, the method has determined that the data packet must have originated from a local port and thus the source address is placed in the table in EACAM 804 with a local bit indicator set to "1." The "1" indicates that the address corresponds to an address for a network device that is associated with a local port of switch 802. The method then proceeds to block 1010 and terminates.

Figure 9:
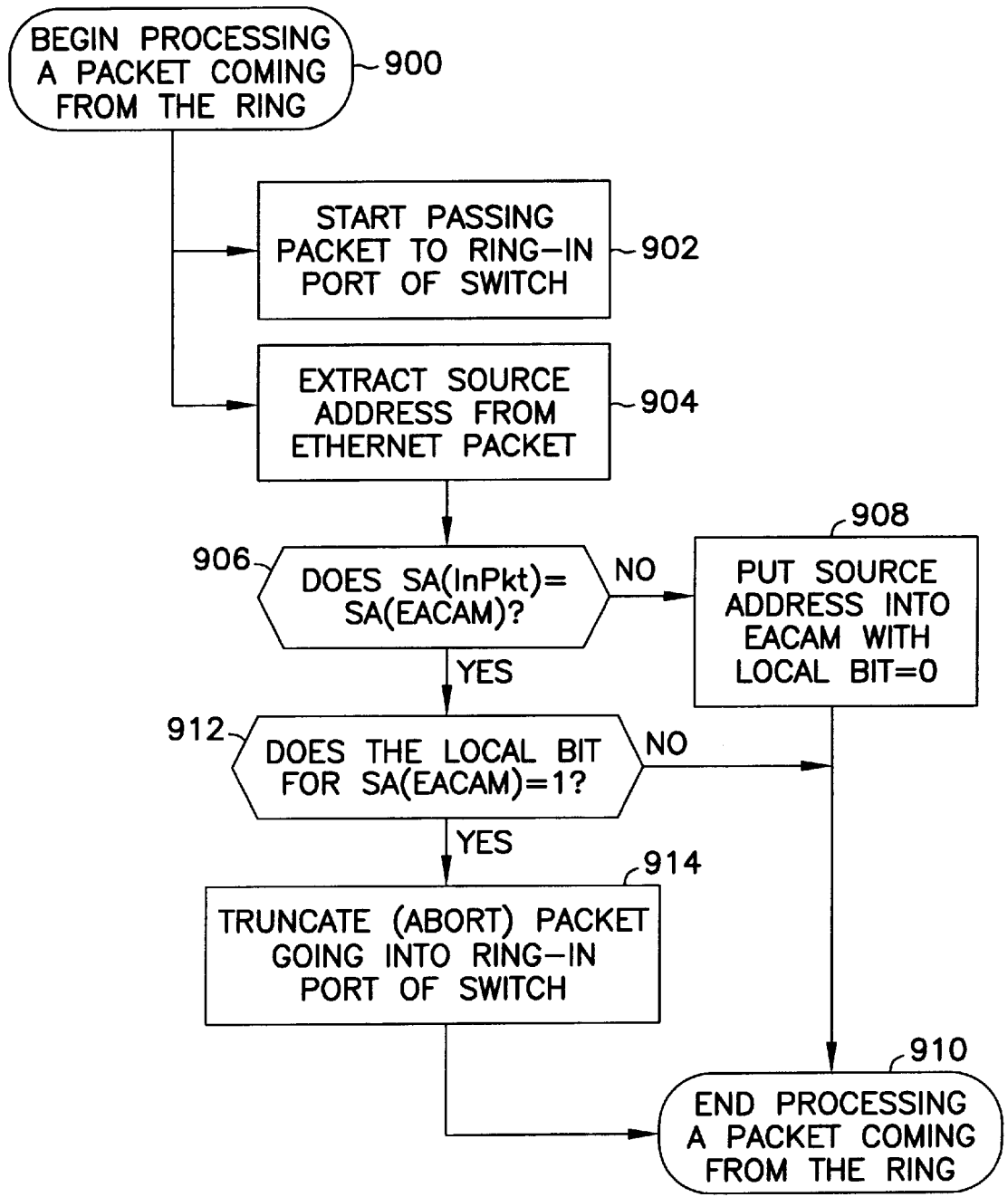
FIG. 9 is a flow chart that illustrates another embodiment of a method for identifying packets with invalid destination addresses according to the teachings of the present invention.

FIG. 9 is a flow chart that illustrates one embodiment of a method for first state machine 806 of FIG. 8 according to the teachings of the present invention. The method begins processing a data packet block 900. The method proceeds to block 902 and provides the data packet on the ring-in port of switch 802. At block 904, the method extracts a source address from the data packet.

At block 906, the method determines whether the source address of the data packet provided to the ring-in port of switch 802 is in the table of EACAM 804. If the address has not already been stored in EACAM 804, the method proceeds to block 908 and places the address in EACAM 804 with a local bit indicator set to "0" and the entire data packet is transmitted into switch 802 without interruption. The "0" indicates that the address is not for a local port of switch 802. The method terminates the processing of the data packet at block 910.

If, at block 906, the source address for the data packet is in EACAM 804, the method proceeds to block 912. The method determines whether the local bit indicator is equal to "1," e.g., the address is associated with a local port. If the local bit indicator is "0," then the method terminates at block 910. If on the other hand, the method determines at block 912 that the local bit indicator is "1," then the method proceeds to block 914 and truncates (aborts) the data packet going into the ring-in port of switch 802. The method ends at block 910.

An alternative embodiment can use two separate CAM memories rather than one CAM with a bit set to "0" or "1" to indicate ring versus local port addresses. Such an embodiment is used by example below in FIG. 12. Further, values other than "0" and "1" can be used to differentiate between local and ring addresses.

Figure 12:
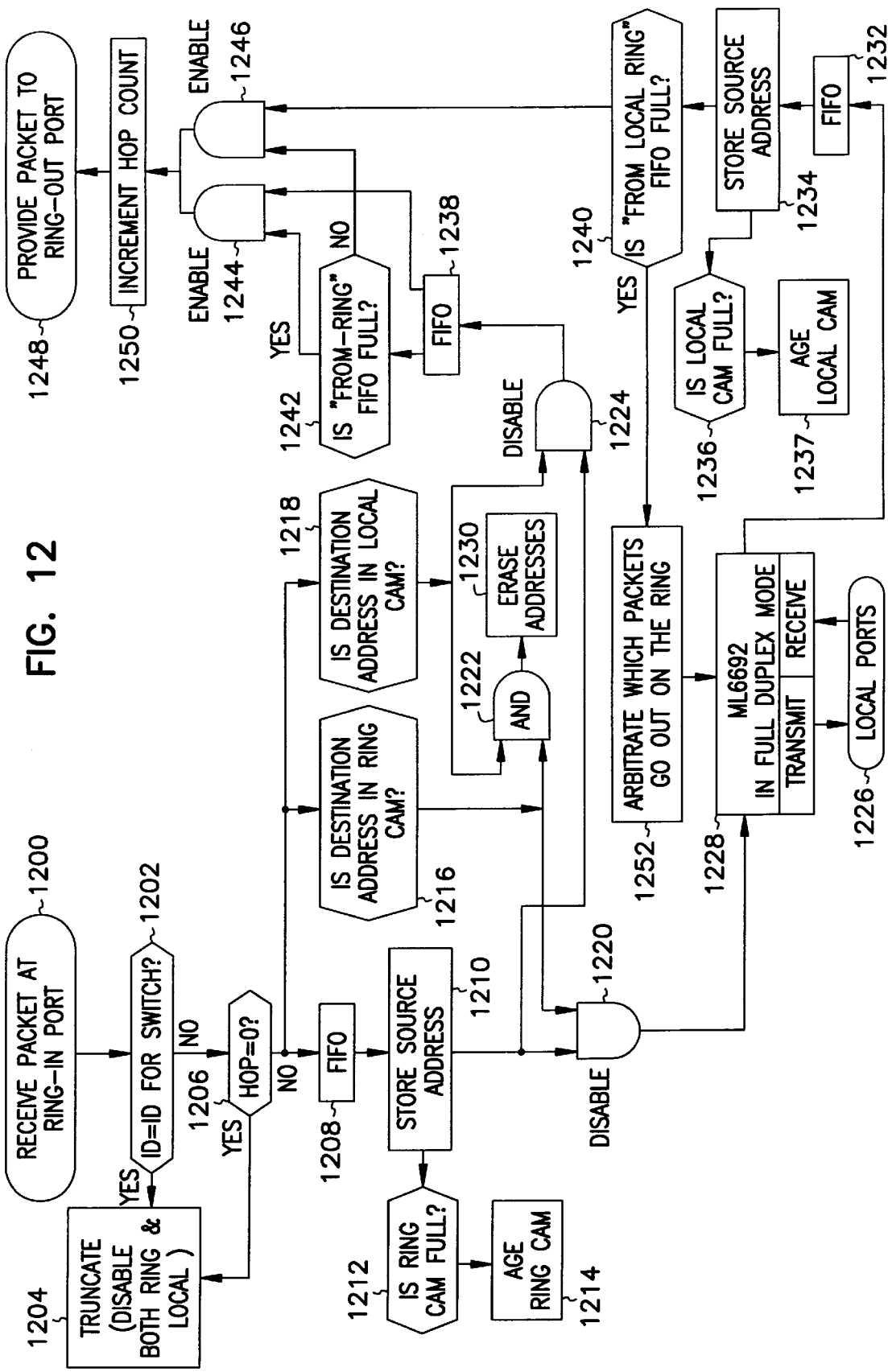
FIG. 12 is a block diagram of a method for processing data packets by a ring switch according to the teachings of the present invention.

FIG. 12 is a block diagram of a method for processing packets in a ring switch according to the teachings of the present invention. In this embodiment, the ring switch uses a counter or an identification number that is appended to data packets in order to determine whether a packet has traveled full circle around a ring network.

At block 1200, packets are received at a ring-in port of a ring switch. At block 1202, the method determines whether the identification number appended to the data packet is the same as the identification number for the ring switch. Identification numbers are appended to data packets as they are received at a local port of the ring switch. If the identification number of the current packet is the same as the identification number of the current ring switch, then the method truncates, aborts or otherwise kills the data packet at block 1204 because it has traveled full circle around the ring network.

At block 1206, the method determines whether a hop counter appended to the data packet is equal to zero. The hop counter is a number that is appended to data packets at the ring switch which originates the data packet. The hop counter is incremented at each subsequent ring switch that processes the data packet and places it back out onto the ring network for transmission to the next ring switch. The hop counter may comprise, for example, an eight bit number such that the counter resets to zero when the data packet has passed through at least 256 ring switches. Alternatively, any other appropriate number of bits can be used for the hop counter. Further, it is understood that the hop counter and the identification number can be used together or separately. If the method determines that the hop counter is set to zero, then the method proceeds to block 1204 because the packet has traveled at least full circle around the ring network.

If at block 1206, the method determines that the packet arriving at the ring-in port has not traveled around the ring, then the packet is processed by the switch to be either transmitted out a local port or out the ring out port. The data packet is stored in a first-in, first-out (FIFO) buffer at block 1208. The source address of the data packet is stored in a memory, most easily a content addressable memory (CAM), for the ring addresses (the Ring CAM) or the aging for the address is updated in the Ring CAM at block 1210. At block 1212, the method determines whether the Ring CAM is full, if so, the oldest addresses in the Ring CAM as judged by the aging information are deleted from the Ring CAM at block 1214. Alternatively, the Ring CAM may simply be reset at block 1214 to erase all the addresses and allow the Ring CAM to relearn the most current addresses.

While the data packet is buffered in the FIFO, the destination address of the data packet is looked-up in the Ring CAM and a CAM that contains the addresses associated with the local ports of the ring switch (the Local CAM) at blocks 1216 and 1218, respectively. At blocks 1216 and 1218, logic signals are produced based on the look-ups in the Ring and Local CAMs. The logic signal from block 1216 is provided to logic gates 1220 and 1222. Further, the logic signal from block 1218 is provided to logic gates 1220 and 1224. Logic gate 1220 is used to pass data packets from the FIFO used at block 1208 to one of the local ports 1226 through switch 1228. It is noted that in this embodiment switch 1228 comprises a typical Ethernet physical interface chip such as an ML6692 switch from Microlinear in Full Duplex mode. Logic gate 1222 is used to erase addresses at block 1230 when the address is found in both the Ring and the Local CAM. This happens when a network device has been move from one switch on the ring to another switch on the ring. Erasing the addresses allows the system to relearn the new location of the device. Finally, logic gate 1224 is used to pass data packets from the FIFO used at block 1208 to the ring-out port through another FIFO, "From-Ring FIFO," at block 1238.

The method of FIG. 12 also accounts for the processing of data packets received at local ports 1226. Such data packets are passed through switch 1228 to a "From-Local" FIFO at block 1232. At block 1234, the source address of the data packet is stored in a memory, most easily a CAM, the Local CAM or the aging for the address is updated in the Local CAM. At block 1236, the method determines whether the Local CAM is full and, if so, the oldest addresses, based on the aging information, are deleted from the CAM at block 1238. Alternatively, the Local CAM may simply be reset at block 1238 to erase all addresses and allow the Local CAM to relearn the most current addresses. For both the Local CAM and the Ring Cam, other forms of aging, such as deleting addresses that have not been used for 5 minutes, or another appropriate period of time may be used. The same is true for the aging requirements of all the other embodiments described in this specification.

The method places data packets from the From-Local and From-Ring FIFOs out onto the ring through the ring-out port. Decisional block 1240 generates a logic signal that controls access to the ring-out port for data packets from the From-Local and From-Ring FIFOs. If the From-Ring FIFO is full, logic gate 1244 is enabled and logic gate 1246 is disabled. Thus, data packets from the From-Ring FIFO are provided out the ring-out port at block 1248 after the hop count is incremented at block 1250. If the From-Ring FIFO is not full, logic gate 1246 is enabled and logic gate 1244 is disabled. Thus, data packets from the From-Local FIFO are provided out the ring-out port at block 1248 after the hop count is incremented at block 1250.

It is noted that at block 1252, a state machine is used to arbitrate the placement of packets onto the ring-out port from the From-Local buffer and the From-Ring buffer when both buffers are full.

It is also noted that if the address of a packet received at the ring-in port is not in either the Local CAM or the Ring CAM, that the packet is "broadcast" to the both the local ports and the ring-out port since neither gate 1220 nor gate 1224 would be disabled based on the output of decisional blocks 1216 and 1218.

Figure 13:
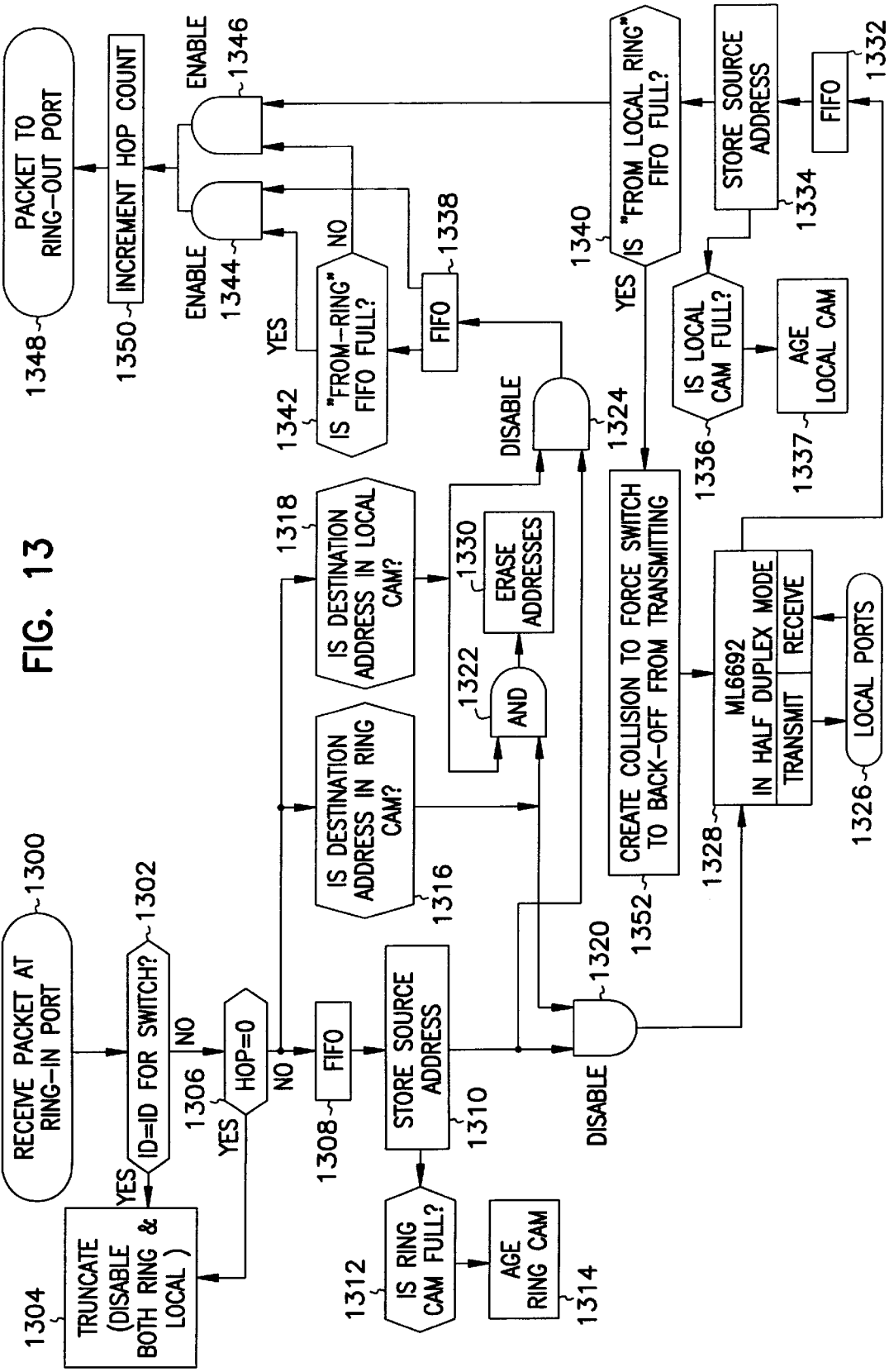
FIG. 13 is a block diagram of another method for processing data packets by a ring switch according to the teachings of the present invention.

FIG. 13 is a block diagram of a method for processing packets in a ring switch according to the teachings of the present invention. In this embodiment, the ring switch uses a counter or an identification number that is appended to data packets in order to determine whether a packet has traveled full circle around a ring network.

At block 1300, packets are received at a ring-in port of a ring switch. At block 1302, the method determines whether the identification number appended to the data packet is the same as the identification number for the ring switch. Identification numbers are appended to data packets as they are received at a local port of the ring switch. If the identification number of the current packet is the same as the identification number of the current ring switch, then the method kills the data packet at block 1304 because it has traveled full circle around the ring network.

At block 1306, the method determines whether a hop counter appended to the data packet is equal to zero. The hop counter is a number that is appended to data packets at the ring switch which originates the data packet. The hop counter is incremented at each subsequent ring switch that processes the data packet and places it back out onto the ring network for transmission to the next ring switch. The hop counter may comprise, for example, an eight bit number such that the counter resets to zero when the data packet has passed through at least 256 ring switches. Alternatively, any other appropriate number of bits can be used for the hop counter. Further, it is understood that the hop counter and the identification number can be used together or separately. If the method determines that the hop counter is set to zero, then the method proceeds to block 1304 because the packet has traveled at least full circle around the ring network.

If at block 1306, the method determines that the packet arriving at the ring-in port has not traveled around the ring, then the packet is processed by the switch to be either transmitted out a local port or out the ring out port. The data packet is stored in a first-in, first-out (FIFO) buffer at block 1308. The source address of the data packet is stored in a memory, most easily a content addressable memory (CAM) for the ring addresses (the Ring CAM) or the aging for the address is updated in that memory at block 1310. At block 1312, the method determines whether the Ring CAM is full, if so, the Ring CAM is aged, by deleting the oldest addresses as determined by the aging information in the memory at block 1314. Alternatively the Ring CAM may simply be reset at block 1314. This erases all of the addresses in the memory allowing the memory to relearn the most current addresses.

While the data packet is buffered in the FIFO, the destination address of the data packet is looked-up in the Ring CAM and a CAM that contains the addresses associated with the local ports of the ring switch (the Local CAM) at blocks 1316 and 1318, respectively. At blocks 1316 and 1318, logic signals are produced based on the look-ups in the Ring and Local CAMs. The logic signal from block 1316 is provided to logic gates 1320 and 1322. Further, the logic signal from block 1318 is provided to logic gates 1320 and 1324. Logic gate 1320 is used to pass data packets from the FIFO used at block 1308 to one of the local ports 1326 through switch 1328. It is noted that in this embodiment switch 1328 comprises a typical Ethernet physical layer interface chip such as an ML6692 switch from Microlinear in Half Duplex mode. Logic gate 1322 is used to erase addresses at block 1330 when the address is found in both the Ring and the Local CAM. Finally, logic gate 1324 is used to pass data packets from the FIFO used at block 1308 to the ring-out port through another FIFO, "From-Ring FIFO," at block 1338.

The method of FIG. 13 also accounts for the processing of data packets received at local ports 1326. Such data packets are passed through switch 1328 to a "From-Local" FIFO at block 1332. At block 1334, the source address of the data packet is stored in the Local CAM or the aging for the address is updated in the Local CAM. At block 1336, the method determines whether the Local CAM is full and, if so, the Local CAM is aged at block 1338. This may be done by erasing the oldest addresses as determined by the aging information stored in the memory, or alternatively the memory may be simply reset at block 1338. This erases all the addresses and allows the CAM to relearn the most current addresses.

A variety of other aging schemes may be used by both the Ring CAM and the Local CAM, such as periodically erasing addresses older than 5 minutes or some other appropriate time. Furthermore, both the method in FIG. 12 and the method in FIG. 13 can be implemented in a single memory or CAM for both ring and local addresses. While using a single memory would lower the cost of manufacture, using two memories greatly simplifies the timing in the logic, making the circuitry easier to design.

The method places data packets from the From-Local and From-Ring FIFOs out onto the ring through the ring-out port. Decisional block 1340 generates a logic signal that controls access to the ring-out port for data packets from the From-Local and From-Ring FIFOs. If the From-Ring FIFO is full, logic gate 1344 is enabled and logic gate 1346 is disabled. Thus, data packets from the From-Ring FIFO are provided out the ring-out port at block 1348 after the hop count is incremented at block 1350. If the From-Ring FIFO is not full, logic gate 1346 is enabled and logic gate 1344 is disabled. Thus, data packets from the From-Local FIFO are provided out the ring-out port at block 1348 after the hop count is incremented at block 1350.

It is noted that at block 1352, collisions are created to force switch 1328 to back-off from transmitting when the From-Local buffer is full.

It is also noted that if the address of a packet received at the ring-in port is not in either the Local CAM or the Ring CAM, that the packet is "broadcast" to the both the local ports and the ring-out port since neither gate 1320 nor gate 1324 would be disabled based on the output of decisional blocks 1316 and 1318.

Conclusion

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. For example, ring switches of the type described herein can be interconnected to form a ring using any appropriate method for transmitting data between switches. This includes without limitation, wireless, wired, printed wire, semiconductor vias, optical fiber and other transmission techniques. Further, the various steps of the methods described herein can be implemented in software, firmware, or hardware. Further, embodiments of the present invention include a single integrated circuit that is designed to perform the various functions described above. Alternatively, a modified conventional switch can be used with additional circuitry as shown, for example, in FIGS. 5, 8, 12 and 13. Further, the various techniques described for identifying packets that have traveled around the ring network can be used with ring switches that use either one bi-directional ring port or ring-in and ring-out ports. Further, the local ports can be other than Ethernet ports, as long as they contain a source address, destination address and data payload. It is also noted that varieties of memory devices other than CAMs can be used to implement the address tables according to the teachings of the present invention. The various aging methods described throughout the specification can be used with any of the embodiments. Further, other well known aging methods can be substituted in place of the described methods without departing from the spirit and scope of the present invention. Further, it is understood that each of the embodiments will work with either a single address table for a ring switch or with multiple address tables. It is further understood that in each of the embodiments described above any one or more of the hop counter, switch identification signal or looking for a source address in an address table for a local port can be used to remove packets that have traveled full circle around the ring.

What is claimed is:

1. A ring network for transporting data packets between network devices, the ring network comprising:

a number of ring switches, each ring switch having at least one ring port, at least one local port and at least one address table, wherein each ring switch is configurable to self learn which network devices, not including ring switches, are associated with the at least one ring port and the at least one local port of the ring switch based on source addresses of packets processed by the ring switch;

the at least one ring port of each ring switch being coupled to a ring port of another ring switch in the ring network;

wherein the ring switch switches data packets between its ring and local ports to direct the data packets to specified network devices associated with the at least one local port of the ring switches in the ring network; and wherein the ports of the ring switches are configured such that data packets received at the at least one ring port and the at least one local port that are not destined for a network device associated with the at least one local port of the ring switch are switched to another ring switch on the ring network based on the at least one address table without the use of a token or encapsulating the packet.

2. The ring network of claim 1, wherein the ring switches each include a ring-in and a ring-out port.

3. The ring network of claim 2, wherein the ring switches store source addresses for data packets received at the ring-in port of a ring switch in the at least one address table with an indication that data packets destined for the source address should be transmitted out the ring-out port of the ring switch.

4. The ring network of claim 1, wherein the ring switches each include a single, bi-directional ring port that allows data packets received at the bi-directional ring port to be retransmitted out the ring port of the switch so that data packets can be forwarded on to other ring switches in the ring network without the use of a token or encapsulating the data packets.

5. The ring network of claim 1, and further including a number of ring transceivers coupled to form a ring, wherein the ring switches are coupled to the ring transceivers.

6. The ring network of claim 1, wherein the ring switches are coupled by conductors on a printed circuit board.

7. The ring network of claim 1, wherein the at least one local port for at least one of the ring switches includes at least one token ring port.

8. The ring network of claim 1, wherein the at least one local port for at least one of the ring switches includes at least one Ethernet port.

9. The ring network of claim 1, wherein the at least one local port for at least one of the ring switches includes at least one Fiber Distributed Data Interface (FDDI) port.

10. The ring network of claim 1, wherein the at least one local port for at least one of the ring switches includes at least one data transfer path.

11. The ring network of claim 10, wherein the at least one local port for at least one of the ring switches includes at least one PCI interface.

12. The ring network of claim 1, wherein each ring switch includes a circuit that removes in coming data packets that have a source address that corresponds to a network device associated with the local port of the switch.

13. The ring network of claim 12, wherein the circuit that removes the incoming data packet includes:
   a first-in, first-out buffer that tracks the source address of data packets received at the at least one ring port;
   an external address table that stores the addresses of network devices associated with the local ports;
   a first state machine that receives data packets for the at least one ring port of the switch and places the source address of the data packet into the first-in, first-out buffer when the source address is not in the external address table, and eliminates the data packet when the source address is in the external address table; and
   a second state machine responsive to the first-in, first-out buffer and the external address table that receives data packets from the at least one ring port of the switch and that stores the source address of the data packet in the external address table when the data packet originated from a local port.

14. The ring network of claim 12, wherein the circuit that removes the incoming data packet includes:
   an external address table that stores the addresses of network devices associated with the local ports;
   first and second state machines responsive to the at least one ring port of the switch that compare source addresses for data packets entering the at least one ring port and exiting the at least one ring port to determine whether the data packets received at the at least one ring port originated from a local port.

15. The ring network of claim 14, wherein
   the first state machine receives data packets for the at least one ring port of the switch, places the source address for the data packet in the external address table when the data packet did not originate from the local port of the switch and eliminates the data packet when the source address corresponds to an address of a network device associated with the local port; and
   the second state machine receives data packets from the at least one ring port of the switch and places the source address of a data packet in the external address table when the data packet originated from a local port.

16. The ring network of claim 12, wherein the ring switches add an identifier signal with data packets originated at the at least one local port of the ring switch and the circuit removes data packets when the identifier signal for a data packet received at the at least one ring port corresponds to the identifier signal for the originating ring switch.

17. The ring network of claim 12, wherein the ring switches add a counter signal to data packets originated at the ring switch, which counter signal is incremented at each subsequent ring switch that processes the data packet, and the circuit removes data packets when the counter signal reaches a selected level.

18. The ring network of claim 1, wherein the ring switches each include a single address table for -identifying the addresses of network devices associated with the at least one ring port and the at least one local port of the ring switch.

19. A ring switch for a ring network, the ring switch comprising:
   at least one ring port that is coupleable to transport data packets in a ring network;
   at least one local port that is coupleable to at least one local area network or device;
   at least one address table that tracks the addresses of network devices, not including ring switches, associated with each port of the ring switch based on source addresses of data packets received at the at least one ring port and the at least one local port of the ring switch; and
   wherein data packets received at the at least one ring port that are not destined for a network device associated with any of the at least one local ports of the ring switch are switched to another ring switch coupled to the at least one ring port based on the at least one address table without the use of a token or encapsulating the packet.

20. The ring switch of claim 19, wherein the ring switch includes a circuit that uses the source address of data packets entering a ring-in port to create entries in the at least one address table for a ring-out port for use in switching data packets.

21. The ring switch of claim 19, wherein the at least one ring port of the ring switch comprises a single, bi-directional ring port that allows data packets received at the ring port to be retransmitted out of the ring port to other ring switches.

22. The ring switch of claim 19, and further comprising a circuit associated with the at least one ring port that removes incoming data packets that have a source address that corresponds to a network device associated with any of the at least one local ports of the switch.

23. The ring switch of claim 22, wherein the circuit includes at least one state machine associated with the at least one ring port that compares the source addresses of data packets entering and exiting the at least one ring port to determine when a data packet with an address associated with one of the at least one local ports is received at the ring port.

24. The ring switch of claim 22, wherein the circuit uses a counter to determine when the data packet should be removed from the ring.

25. The ring switch of claim 22, wherein the circuit uses an identifier signal associated with the ring switch to remove data packets that originated from a local port of the ring switch.

26. The ring switch of claim 19, wherein at least one of the local ports is configured as an Ethernet port.

27. A ring switch for a ring network, the ring switch comprising:
- a bi-directional ring port that is coupleable to receive data packets from and transmit data packets over a ring of ring switches;
- at least one local port that is coupleable to at least one local area network;
- at least one address table that is configurable to self learn and store the addresses of network devices, not including ring switches associated with the at least one bi-directional ring port and the at least one local port based on source addresses from data packets processed by the ring switch;
- wherein the ring switch allows data packets received at the ring port to be retransmitted out the ring port of the switch so that data packets can be forwarded on to other ring switches in the ring network based on the at least one address table without the use of a token or encapsulating the packet; and
- a circuit associated with the bi-directional ring port that removes incoming data packets that have a source address that corresponds to a network device associated with the at least one local port of the switch.

28. The ring switch of claim 27, wherein the circuit includes first and second state machines associated with the bi-directional ring port that compares the source addresses of data packets entering and exiting the bi-directional ring port to determine when a data packet with an address associated with one of the at least one local ports is received at the ring port.

29. The ring switch of claim 27, wherein the circuit uses a counter to determine when the data packet should be removed from the ring.

30. The ring switch of claim 27, wherein the circuit uses an identifier signal associated with the ring switch to remove data packets that originated from a local port of the ring switch.

31. The ring switch of claim 27, wherein at least one of the at least one local ports is configured as an Ethernet port.

32. A ring switch for a ring network, the ring switch comprising:
- a ring-in port that is coupleable to receive data packets from the ring network;
- a ring-out port that is coupleable to provide data packets to the ring network;
- at least one local port that is coupleable to a local area network;
- at least one address table to track the addresses of network devices, not including ring switches, associated with the ports of the ring switch; and
- wherein the address table associates the addresses of network devices with the ring-out port when data packets are received at the ring-in port without the use of a token or encapsulating the packet.

33. The ring switch of claim 32, and further comprising a circuit associated with the ring-in port that removes incoming data packets that have a source address that corresponds to a network device associated with the at least one local port of the switch.

34. The ring switch of claim 33, wherein the circuit includes first and second state machines associated with the ring-in and ring-out ports, respectively, that compares the source addresses of data packets entering the ring-in port and exiting the ring-out port to determine when an packet with an address associated with one of the at least one local ports is received at the ring port.

35. The ring switch of claim 33, wherein the circuit uses a counter to determine when the packet should be removed from the ring.

36. The ring switch of claim 33, wherein the circuit uses an identifier signal associated with the ring switch to remove packets that originated from a local port of the ring switch.

37. The ring switch of claim 33, wherein the at least one local port includes a local port configured as an Ethernet port.

38. A method for processing data packets in a ring network, the method comprising:
- receiving a data packet at a ring port of a ring switch of the ring network;
- reading a source address from the data packet;
- comparing the source address with at least one address table of the ring switch, wherein the at least one address table indicates which addresses are associated with each port of the switch;
- when the source address corresponds to a network device that is associated with a local port of the ring switch, discarding the data packet; and
- when the source address is not in the address table, associating the source address with the ring port in the address table without the use of a token or encapsulating the packet.

39. The method of claim 38, wherein receiving a data packet comprises receiving an Ethernet packet.

40. The method of claim 38, wherein comparing the source address with the at least one address table comprises comparing the source address with more than one address table for ports of the ring switch.

41. A method for processing data packets in a ring switch of a ring network, the method comprising:
- receiving a data packet at a bi-directional ring port of the ring switch;
- reading the source address of the data packet;
- when the source address is not in an address table for a port of the ring switch, storing the source address in at least one address table with an indication that the address is for a network device, not including a ring switch, associated with the ring port;
- reading a destination address from the data packet;
- when the destination address for the data packet is in an address table for the ring switch, switching the data packet to the port of the ring switch that is associated with the destination address, even if the data packet was received at the ring port and the destination address is associated with the ring port without using a token or encapsulating the data packet;
- when the destination address for the data packet is not in an address table for the ring switch or the data packet is a broadcast data packet, broadcasting the data packet to all ports of the ring switch; and
- when the destination address for the data packet is a multicast address, broadcasting the data packet to all appropriate ports of the ring switch.

42. The method of claim 41, and further comprising removing the data packet from the ring network when the source address is in the address table with an indication that the network device is associated with a local port.

43. The method of claim 41, and further comprising removing the data packet from the ring network when a counter associated with the data packet reaches a selected value.

44. The method of claim 41, and further comprising removing the data packet from the ring network when the data packet includes an identification signal that indicates that the data packet originated from a local port of the ring switch.

45. A method for processing data packets in a ring switch of a ring network, the method comprising:

receiving a data packet at a ring-in port of the ring switch;

reading the source address of the ring packet;

when the source address is not in an address table for a port of the ring switch, storing the source address in the address table with an indication that the address is for a network device, not including a ring switch, associated with a ring-out port of the ring switch;

reading a destination address from the data packet;

when the destination address for the data packet is in an address table for the ring switch, switching the data packet to the port of the ring switch that is associated with the destination address;

when the destination address for the data packet is not in an address table for the ring switch or the data packet is a broadcast data packet, broadcasting the data packet; and when the destination address for the data packet is a multicast address, broadcasting the data packet to all appropriate ports of the ring switch.

46. The method of claim 45, and further comprising removing the data packet from the ring network when the source address is in the address table with an indication that the network device is associated with a local port.

47. The method of claim 45, and further comprising removing the data packet from the ring network when a counter associated with the data packet reaches a selected value.

48. The method of claim 45, and further comprising removing the data packet from the ring network when the data packet includes an identification signal that indicates that the data packet originated from a local port of the ring switch.

* * * * *